(12) United States Patent
Kim et al.

(10) Patent No.: US 11,194,390 B2
(45) Date of Patent: Dec. 7, 2021

(54) ELECTRONIC DEVICE FOR PLAYING CONTENT AND COMPUTER-READABLE RECORDING MEDIUM

(71) Applicant: Samsung Electronics Co., Ltd., Suwon-si (KR)

(72) Inventors: Se-Hoon Kim, Suwon-si (KR); Won-Hee Choe, Seoul (KR); Min-Woo Lee, Hwaseong-si (KR); Jae-Sung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/497,179

(22) PCT Filed: Mar. 15, 2018

(86) PCT No.: PCT/KR2018/003047
§ 371 (c)(1),
(2) Date: Sep. 24, 2019

(87) PCT Pub. No.: WO2018/174466
PCT Pub. Date: Sep. 27, 2018

(65) Prior Publication Data
US 2020/0097079 A1    Mar. 26, 2020

(30) Foreign Application Priority Data

Mar. 24, 2017   (KR) ........................ 10-2017-0037630

(51) Int. Cl.
*G09G 1/00* (2006.01)
*G06F 3/01* (2006.01)
(Continued)

(52) U.S. Cl.
CPC ......... *G06F 3/013* (2013.01); *G02B 27/0172* (2013.01); *G06F 3/017* (2013.01);
(Continued)

(58) Field of Classification Search
CPC ......... G02B 27/01; G06T 19/00; G06F 17/30; G06F 3/14
See application file for complete search history.

(56) References Cited

U.S. PATENT DOCUMENTS 6,497,649 B2   12/2002  Parker et al.
8,594,381 B2   11/2013  Fedorovskaya et al.
(Continued)

FOREIGN PATENT DOCUMENTS

JP      2008-299760 A     12/2008
KR   10-2009-0102116 A     9/2009
(Continued)

OTHER PUBLICATIONS

Extended European Search Report dated Mar. 4, 2020, issued in European Application No. 18770648.6.
(Continued)

*Primary Examiner* — Michael A Faragalla
(74) *Attorney, Agent, or Firm* — Jefferson IP Law, LLP

(57) ABSTRACT

Electronic devices, according to various embodiments of the present invention, comprise: a display for displaying content; and a processor, wherein the processor may confirm additional information relating to the field of view (FoV) for content or setting information relating to the FoV, identify a first FoV for the content on the basis of the additional information or the setting information, and display the content using the display on the basis of the first FoV that has been identified.

17 Claims, 27 Drawing Sheets

(51) Int. Cl.
  *G02B 27/01* (2006.01)
  *G06F 3/0488* (2013.01)
  *G06T 19/00* (2011.01)

(52) U.S. Cl.
  CPC ........ G06F 3/04883 (2013.01); G06T 19/006 (2013.01); *G02B 2027/014* (2013.01); *G02B 2027/0178* (2013.01); *G09G 2354/00* (2013.01)

(56) References Cited

U.S. PATENT DOCUMENTS

| | | | |
|---|---|---|---|
| 9,392,212 B1* | 7/2016 | Ross | G11B 27/005 |
| 2002/0099257 A1 | 7/2002 | Parker et al. | |
| 2009/0245347 A1 | 10/2009 | Lee et al. | |
| 2012/0081363 A1 | 4/2012 | Kang et al. | |
| 2012/0121138 A1 | 5/2012 | Fedorovskaya et al. | |
| 2012/0327116 A1 | 12/2012 | Liu et al. | |
| 2014/0268356 A1* | 9/2014 | Bolas | G02B 27/017 359/630 |
| 2016/0260258 A1* | 9/2016 | Lo | G09G 5/363 |
| 2016/0364198 A1 | 12/2016 | Song et al. | |
| 2018/0005447 A1* | 1/2018 | Wallner | G06F 16/40 |
| 2018/0041750 A1* | 2/2018 | Kim | G06T 15/20 |
| 2018/0047213 A1* | 2/2018 | Woo | G06K 9/00671 |
| 2018/0146186 A1* | 5/2018 | Akkaya | G01S 1/00 |

FOREIGN PATENT DOCUMENTS

| | | |
|---|---|---|
| KR | 10-1606854 B1 | 3/2016 |
| KR | 10-2016-0112898 A | 9/2016 |
| KR | 10-2016-0145976 A | 12/2016 |

OTHER PUBLICATIONS

Korean Office Action with English translation dated Oct. 7, 2021; Korean Appln. No. 10-2017-0037630.

* cited by examiner

CONFIGURATION INFORMATION

|   | 1 | 2 | 3 | 4 | 5 | 6 | 7 | 8 | 9 |
|---|---|---|---|---|---|---|---|---|---|
| 1 |   |   |   |   |   |   |   |   |   |
| 2 |   |   |   |   |   |   |   |   |   |
| 3 |   |   |   |   | A |   |   |   |   |
| 4 |   |   |   |   |   |   |   |   |   |
| 5 |   |   |   |   |   |   |   |   |   |
| 6 |   |   |   |   |   |   |   |   |   |
| 7 |   |   |   |   |   |   |   |   |   |
| 8 |   |   |   |   |   |   |   |   |   |
| 9 |   |   |   |   |   |   |   |   |   |

ADDITIONAL INFORMATION

FIG.7A

| ADDITIONAL INFORMATION | FoV |
|---|---|
| 1 | a |
| 2 | b |
| 3 | c |
| 4 | d |
| 5 | e |
| 6 | f |
| 7 | g |

(a)

| CONFIGURATION INFORMATION | FoV |
|---|---|
| 1 | A |
| 2 | B |
| 3 | C |
| 4 | D |
| 5 | E |
| 6 | F |
| 7 | G |

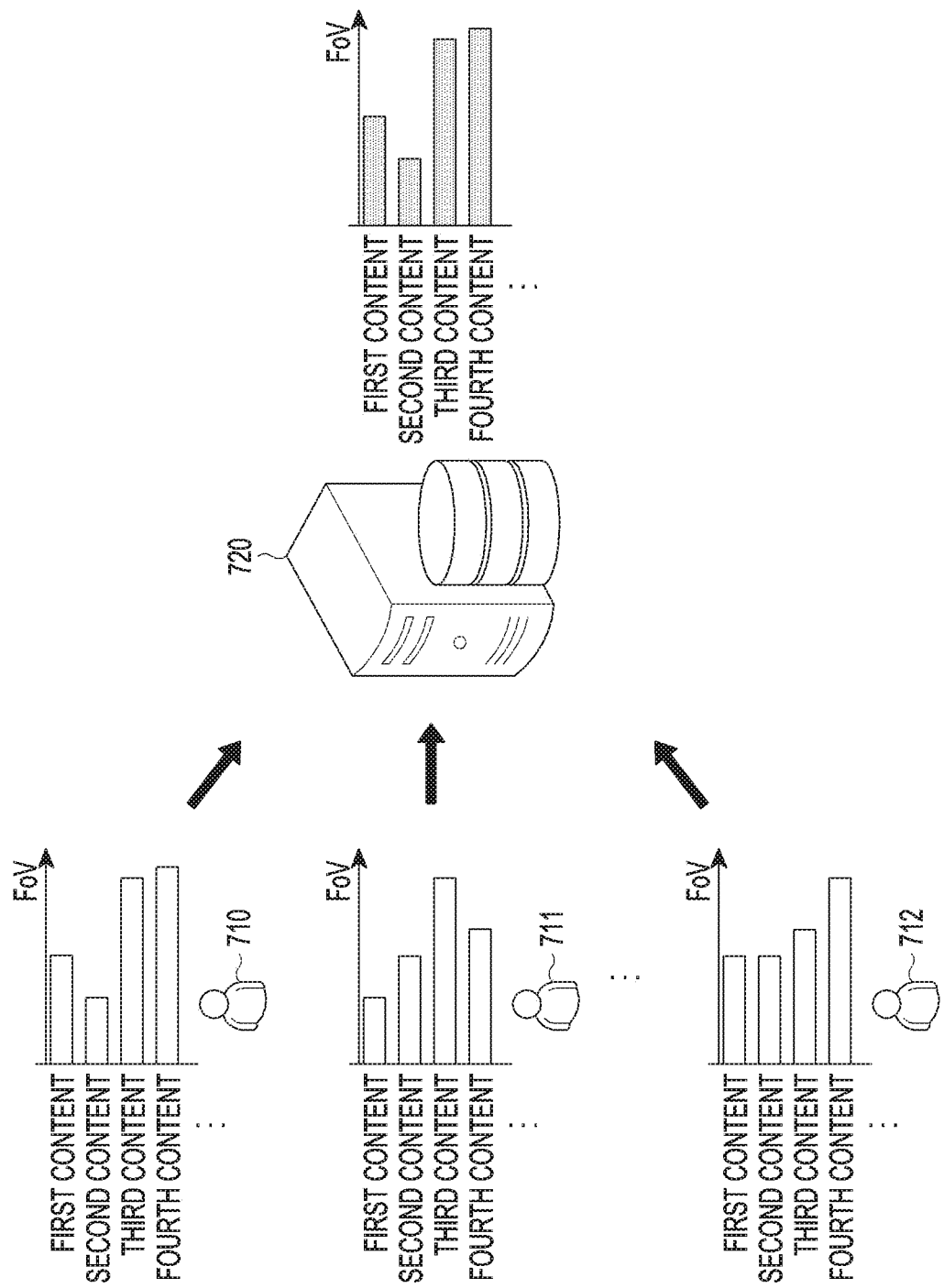

ELECTRONIC DEVICE FOR PLAYING CONTENT AND COMPUTER-READABLE RECORDING MEDIUM

CROSS-REFERENCE TO RELATED APPLICATION(S)

This application is a U.S. National Stage application under 35 U.S.C. § 371 of an International application number PCT/KR2018/003047, filed on Mar. 15, 2018, which is based on and claimed priority of a Korean patent application number 10-2017-0037630, filed on Mar. 24, 2017, in the Korean Intellectual Property Office, the disclosure of which is incorporated by reference herein in its entirety.

TECHNICAL FIELD

Various embodiments of the disclosure relate to an electronic device for playing content and a computer-readable recording medium.

BACKGROUND ART

Generally, virtual reality (VR) may refer to an environment or circumstance similar to a real-life environment as created by computer graphics and mean an interface allowing human beings to feel it through their sense organs as if they interact with it. A user may interact with virtual reality in real-time through device manipulation and may have a similar sensory experience to that in the real world.

Augmented reality (AR) refers to a computer graphic technique that combines virtual objects or information with a real-world environment to display the virtual objects as if they were present in the real environment. Such AR is a technique for overlaying a virtual object on a real world seen by a user, and is also called mixed reality (MR) because it merges additional information and a virtual world with a real world in real time to show the merged world as one image.

Recently, the VR technique has become frequently and easily accessible in various services such as education, games, navigation, advertisement, or blogs through electronic devices supporting a VR service.

DETAILED DESCRIPTION OF THE INVENTION

Technical Problem

When content having a field of view (FoV) that is larger than that of general content, for example, VR content is displayed through an electronic device, some users complain of a symptom such as dizziness, giddiness, nausea, etc. When the FoV of the content is reduced to relieve a symptom such as dizziness, giddiness, nausea, etc., the sense of presence the users may experience through the content may be degraded.

Various embodiments of the present disclosure provide an electronic device to solve the foregoing or other problems.

Technical Solution

According to various embodiments of the disclosure, an electronic device includes a display and a processor, in which the processor is configured to identify information related to a field of view (FoV) for content, to determine the FoV for the content based on the information, and to play display data of the content based on the determined FoV, by using the display.

According to various embodiments of the disclosure, a non-transitory computer-readable recording medium has recorded thereon a program to be executed on a computer, in which the program includes executable instructions that cause, when executed by a processor, the processor to identify information related to a field of view (FoV) for content, to determine the FoV for the content based on the information, and to play display data of the content based on the determined FoV, by using the display.

According to various embodiments of the disclosure, a head-mounted electronic device includes a frame on which a display is mountable on or demountable from, an interface arranged on a side of the frame and communicating with the display in connection with the display, at least one lens which is arranged to be movable in the frame and a focus of which is adjusted according to applied electric current, a driving unit arranged in the frame and moving the at least one lens in the frame, and a processor arranged in the frame, in which the processor is configured to receive information related to a field of view (FoV) for content from the display through the interface, to determine the FoV for the content based on the information, and to move the at least one lens or adjust a focus of the at least one lens, based on the determined FoV.

Advantageous Effects

According to various embodiments of the disclosure, an electronic device may determine a field of view (FoV) for content based on information related to the FoV for the content and reproduce display data of the content based on the determined FoV. Hence, a loss in presence a user may experience through the content may be minimized, while alleviating a symptom such as dizziness, giddiness, nausea, etc., the user may have.

BRIEF DESCRIPTION OF DRAWINGS

FIGS. 7A and 7B illustrate a mapping table for determining an FoV, according to various embodiments of the disclosure.

FIG. 7C is a diagram for describing a method of using information about an FoV for content, which is configured by a plurality of users, according to various embodiments of the disclosure.

MODE FOR CARRYING OUT THE INVENTION

Figure 1:
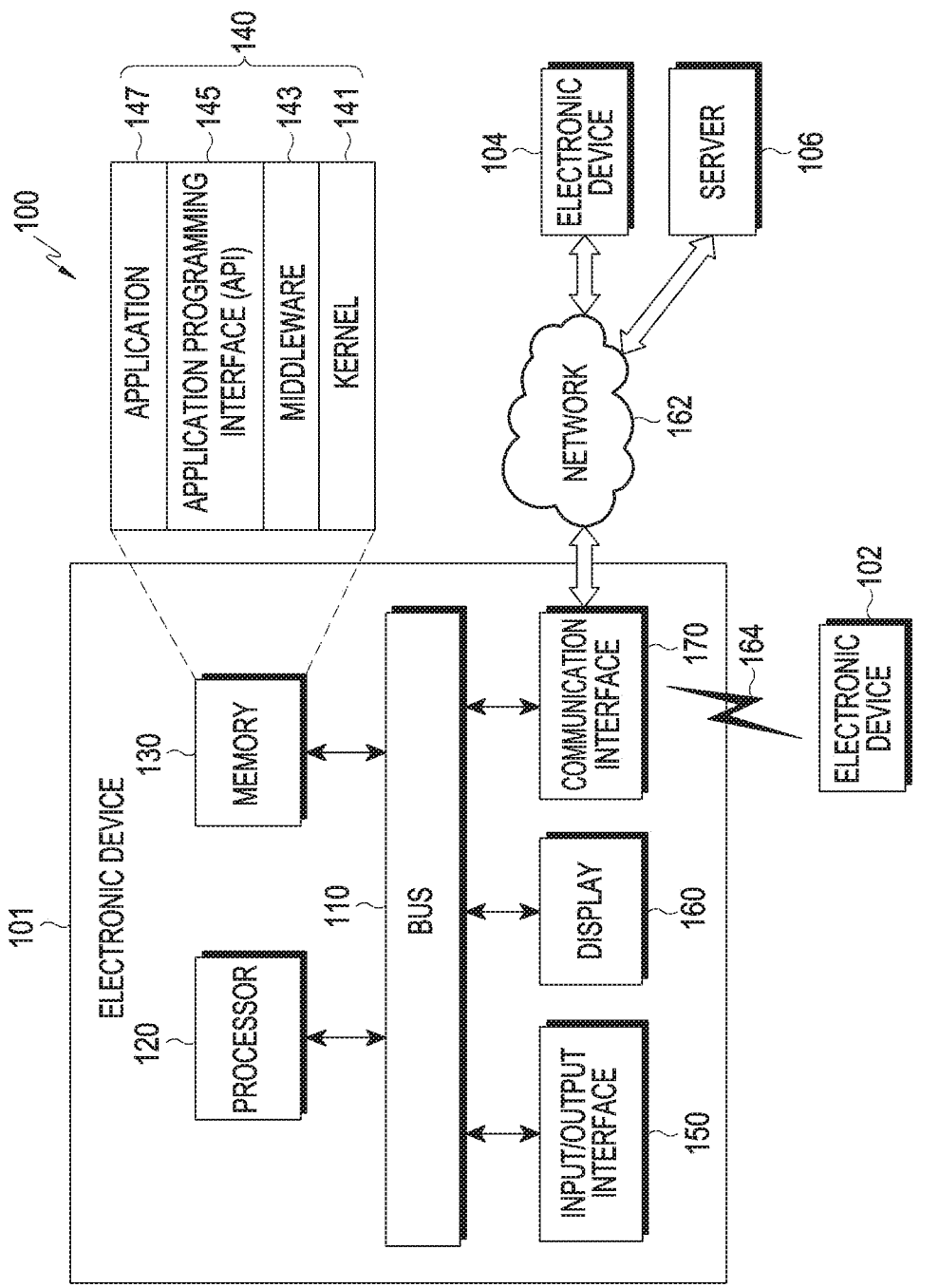
FIG. 1 illustrates a network environment including an electronic device according to various embodiments of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, mobile medical equipment, a camera, or a wearable device. Examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implantable circuit, or the like. In some embodiments, the electronic device may include, for example, at least one of a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a media box (e.g., Samsung HomeSync™, Apple TV™, or Google TV™), a game console (e.g., Xbox™ or PlayStation™), an electronic dictionary, an electronic key, a camcorder, or an electronic frame.

In other embodiments, the electronic device may include at least one of various medical equipment (e.g., various portable medical measurement devices (a blood glucose meter, a heart rate measuring device, a blood pressure measuring device, a body temperature measuring device, etc.), magnetic resonance angiography (MRA), magnetic resonance imaging (MRI), computed tomography (CT), an imaging device, or an ultrasonic device), a navigation system, a global navigation satellite system (GNSS), an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sale (POS), or an Internet of things device (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of furniture, a building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic devices are not limited to those described above. Herein, the term "user" used in various embodiments of the present disclosure may refer to a person who uses the electronic device or a device using the electronic device (e.g., an artificial intelligence electronic device).

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements. The bus 110 may include a circuit for connecting, e.g., the elements 110 to 170 and delivering communication (e.g., a control message or data) between the elements 110 to 170. The processor 120 may include one or more of a central processing unit (CPU), an application processor (AP), and a communication processor (CP). The processor 120 may perform operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147 and may process the one or more task requests. The API 145 is an interface used for the application 147 to control a function provided by the kernel 141 or the middleware 143, and may include, for example, at least one interface or function (e.g., an instruction) for file control, window control, image processing or character control. The I/O interface 150 may deliver, for example, an instruction or data input from a user or another external device to other component(s) of the electronic device 101 or output an instruction or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, and/or a symbol, etc.) to users. The display 160 may include a touch screen, and receives a touch, a gesture, proximity, or a hovering input, for example, by using an electronic pen or body part of a user. The communication interface 170 establishes communication between the electronic device 101 and an external device (e.g., the vehicle device 102, the electronic device 104, or the server 106). For example, the communication interface 170 may be connected to a network 162 through a wireless communication or wired communication to communicate with an external device (e.g., the second external electronic device 104 or the server 106).

The wireless communication may include cellular communication using at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). According to an embodiment, the wireless communication may include at least one of Wireless Fidelity (WiFi), light fidelity (LiFi), Bluetooth, Bluetooth Low Energy (BLE), Zigbee, near field communication (NFC), magnetic secure transmission (MST), radio frequency (RF), or a body area network (BAN), as illustrated as an element 164 in FIG. 1. According to an embodiment, the wireless communication may include a global navigation satellite system (GNSS). The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of a universal serial bus (USB), a high definition multimedia interface (HDMI), Recommended Standard 232 (RS-232), power line communication, a plain old telephone service (POTS), or the like. The network 162 may include a telecommunications network, for example, at least one of a computer network (e.g., a local area network (LAN) or a wide area network (WAN)), Internet, or a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

According to various embodiments of the disclosure, the display 160 may play display data of content. The content may be received from an external electronic device or a server and stored in the memory 130. The content may be two-dimensional (2D) content or 3D content, and may include at least one of an image, a video, a web page, or a user interface (UI). In another example, the content may be virtual reality (VR) content or augmented reality (AR)

content. For example, the content may indicate the entire space configured in VR or AR. In another example, the content may include left-eye content and right-eye content. The processor 120 may display the left-eye content and the right-eye content on a left part and a right part of the display 160, respectively, thus providing presence to the user.

According to various embodiments of the disclosure, the display 160 may play display data of the content, based on a field of view (FoV) designated in the electronic device 101 or for an application used in playback of the content. The FoV may be information used during playback of the content. For example, the FoV may be used to determine display data to be played through the display 160 from whole data of the content used for playback of the content. The processor 120 may determine display data to be played through the display 160 from the whole data of the content used for playback of the content, based on the FoV, and play the determined display data of the content by using the display 160.

In an example, the display data of the content may be determined to be the whole data of the content used for playback of the content or to be at least a part of the whole data of the content. In another example, the display data of the content may be determined based on the FoV and a direction of the electronic device 101 identified through a sensor of the electronic device 101.

According to various embodiments of the disclosure, the processor 120 may identify information related to the FoV for the content. For example, the information related to the FoV for the content may include at least one of additional information related to the FoV for the content or configuration information related to the FoV.

The additional information may be included in meta data of the content, and the processor 120 may identify the additional information from the meta data of the content. In another example, the processor 120 may identify the additional information related to the FoV from the content. For example, the processor 120 may identify the additional information related to the FoV from the display data of the content to be played using the display 160. The processor 120 may identify the additional information related to the FoV from the display data of the content, even when the additional information is not included in the meta data of the content.

According to various embodiments of the disclosure, the additional information may include information indicating an FoV, which is configured for the content, or information used to determine an FoV for the content.

For example, the information indicating the FoV, which is configured for the content, may be configured to indicate an optimal FoV for the content at the time of manufacturing of the content or in the course of releasing the content.

The information used to determine the FoV for the content may include at least one of information indicating whether the content is 2D content or 3D content, information indicating whether the content is an image or a video, information indicating whether the content provides an interface for interaction, or information about motion of at least one object included in the content.

However, this is merely an example for the purpose of description, and the disclosure is not limited to the example, such that various information available for determining the FoV for the content may be included in information used to determine the FoV for the content.

In another example, the information used to determine the FoV for the content may further include information indicating a type of the content. For example, the information indicating the type of the content may be information indicating a type of the content among a plurality of types of the content which are designated in relation to the FoV. Even when the content is played based on the same FoV, the user may have a different symptom, e.g., dizziness, giddiness, nausea, or the like, for a different type of the content, e.g., a movie, a game, a web, a UI, or the like, such that the information indicating the type of the content may be included in the information used to determine the FoV.

According to various embodiments of the disclosure, the processor 120 may identify configuration information related to the FoV. The configuration information may be configuration information related to the electronic device 101 or an application used for playback of content.

For example, the configuration information may include at least one of configuration information indicating whether screen switchover is possible according to movement of a head of the user, configuration information about a method of playing the display data of the content, or configuration information about a brightness used for playback of the display data of the content. However, this is merely an example for the purpose of description, and the disclosure is not limited to the example, such that various configuration information related to an electronic device or an application available for determining the FoV may be included as the configuration information related to the FoV.

According to various embodiments of the disclosure, the processor 120 may determine the FoV for the content based on the identified information related to the FoV for the content. A symptom, such as dizziness, giddiness, nausea, or the like, the user may have differs with characteristics, a type, etc., of the content, and also differs for the same content according to configuration information of an electronic device in which the content is played, such that the processor 120 may determine the FoV for the content by using the identified information related to the FoV.

For example, the processor 120 may determine the FoV for the content by using both the additional information and the configuration information that are included in the information related to the FoV. In another example, the processor 120 may determine the FoV for the content by using one of the additional information and the configuration information that are included in the information related to the FoV. For example, the processor 120 may determine the FoV for the content by using only the additional information and may determine the FoV for the content by using only the configuration information.

According to various embodiments of the disclosure, the processor 120 may determine the FoV for the content based on the information for determining the FoV. The information for determining the FoV may be stored in the memory 130. The processor 120 may determine the FoV for the content based on the information for determining the FoV and the identified information related to the FoV.

According to various embodiments of the disclosure, the processor 120 may determine the FoV for the content based on the identified information related to the FoV for the content and information about an FoV, which is configured by the user. The processor 120 may determine the FoV for the content by further using the user-configured information about the FoV to reflect personal characteristics of the user.

For example, the user-configured information about the FoV may further include not only the user-configured information about the FoV, but also information about an FoV, which is configured for the content by another user watching the content. The information about the FoV, which is configured for the content by the other user, may be received from a server that manages a plurality of contents. For example, the information about the FoV, which is configured for the content by the other user, may be stored in the server in relation to the content and may be received together during reception of the content. In another example, the information about the FoV, which is configured for the content by the other user, may be received from the server at the request of the user of the electronic device 101.

According to various embodiments of the disclosure, the processor 120 may display the received information about the FoV, which is configured for the content by the other user, on the display 160, so that the user may use the received information to configure the information about the FoV for the content.

According to various embodiments of the disclosure, the processor 120 may determine the FoV for the content based on the information for determining the FoV, stored in the memory 130, the identified information related to the FoV, and the user-configured information about the FoV.

For example, the information for determining the FoV, which is stored in the memory 130, may include various information available for determining the FoV for the content based on the information related to the FoV or the user-configured information about the FoV, such as a mapping table.

In another example, the processor 120 may determine the FoV for the content by using software for determining the FoV, which is stored in the memory 130. The processor 120 may execute the software and determine the FoV for the content based on the identified information related to the FoV or based on the identified information related to the FoV and the user-configured information about the FoV, through the executed software.

According to various embodiments of the disclosure, the processor 120 may play the display data of the content based on the determined FoV, by using the display 160. For example, when the FoV for the content is designated (e.g., the FoV is designated in the electronic device 101 or an application used for playback of the content) before the processor 120 determines the FoV, the processor 120 may adjust the designated FoV as the determined FoV.

The processor 120 may adjust the display data of the content based on the determined FoV and play the adjusted display data of the content by using the display 160. The processor 120 may adjust the display data of the content based on the determined FoV, so that a height of a screen displayed through the display 160 at a designated rate is adjusted. For example, the designated rate may be designated by reflecting human visual characteristics.

In another example, the processor 120 may play designated image data overlappingly with the display data of the content in at least a region of the display 160, which is determined based on the determined FoV.

According to various embodiments of the disclosure, the determined FoV may be set to a value that changes with playback of the display data of the content. For example, the processor 120 may determine whether the determined FoV changes with playback of the display data of the content, and play the display data of the content based on the changed FoV by using the display 160 when the determined FoV is changed.

According to various embodiments of the disclosure, the processor 120 may play the display data of the content based on the designated FoV by using the display 160, and may play the display data of the content based on the determined FoV by using the display 160, after an elapse of a designated time. For example, the processor 120 may adjust the FoV for the content from the designated FoV directly or gradually to the determined FoV after the elapse of the designated time.

According to various embodiments of the disclosure, the processor 120 may play the display data of the content based on the designated FoV by using the display 160. The processor 120 may play the display data of the content based on the determined FoV by using the display 160, after playback of the display data, which corresponds to a designated frame number, of the content based on the designated FoV. For example, after display of the display data of the content, which corresponds to the designated frame number, based on the designated FoV, the processor 120 may adjust the FoV for the content from the designated FoV directly or gradually to the determined FoV.

According to various embodiments of the disclosure, the processor 120 may deliver information about the determined FoV and the display data of the content to the display 160. The processor 120 may deliver the information about the determined FoV and the display data of the content to the display 160 without adjusting the display data of the content based on the determined FoV. The display 160 may play the display data of the content based on the information about the determined FoV, which is received from the processor 120.

According to various embodiments of the disclosure, the processor 160 may determine a region of the display 160 for playing the display data of the content based on the information about the determined FoV. The display 160 may play the display data of the content through the determined region of the display 160. The display 160 may play the display data of the content through the region of the display 160 and may not play the display data of the content through other regions of the display 160 than the region of the display 160.

According to various embodiments of the disclosure, the processor 160 may adjust the display data of the content to correspond to the determined region of the display 160. For example, the display 160 may play the adjusted display data of the content through the region of the display 160.

Figure 2:
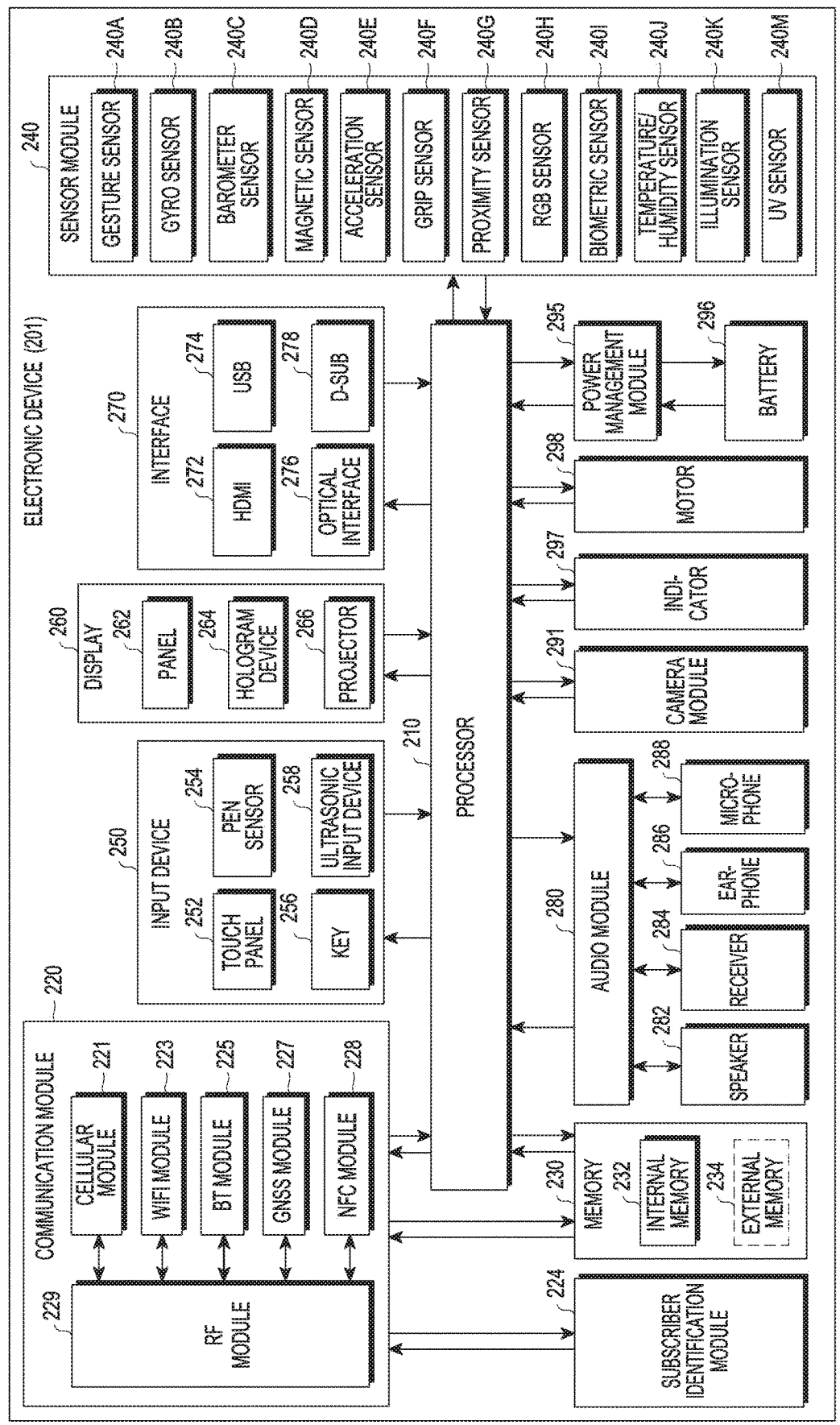
FIG. 2 is a block diagram of a programming module according to various embodiments of the present disclosure.

FIG. 2 is a block diagram of an electronic device 201 according to various embodiments of the present disclosure. The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 controls multiple hardware or software components connected to the processor 210 by driving an operating system (OS) or an application program, and performs processing and operations with respect to various data. The processor 210 may be implemented with, for example, a system on chip (SoC). According to an embodiment of the present disclosure, the server 210 may include a graphic processing unit (GPU) and/or an image signal processor. The processor 210 may include at least some of the elements illustrated in FIG. 2 (e.g., the cellular module 221). The processor 210 loads an instruction or data received from at least one of other elements (e.g., a non-volatile memory) into a volatile memory to process the instruction or data, and stores result data in the non-volatile memory.

The communication module 220 may have a configuration that is the same as or similar to the communication interface 170. The communication module 220 may include, for example, the cellular module 221, a WiFi module 223, a Bluetooth (BT) module 225, a GNSS module 227, an NFC module 228, and a radio frequency (RF) module 229. The cellular module 221 may provide, for example, a voice call, a video call, a text service, or an Internet service over a communication network. According to an embodiment of the present disclosure, the cellular module 221 may identify and authenticate the electronic device 201 in a communication network by using the SIM 224 (e.g., a SIM card). According to an embodiment of the present disclosure, the cellular module 221 may perform at least one of functions that may be provided by the processor 210. According to an embodiment of the present disclosure, the cellular module 221 may include a communication processor (CP). According to an embodiment of the present disclosure, at least some (e.g., two or more) of the cellular module 221, the WiFi module 223, the BT module 225, the GNSS module 227, or the NFC module 228 may be included in one integrated chip (IC) or IC package. The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment of the present disclosure, at least one of the cellular module 221, the WiFi module 223, the BT module 225, the GNSS module 227, or the NFC module 228 may transmit and receive an RF signal through the separate RF module. The SIM 224 may, for example, include a card including a SIM or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, or a solid state drive (SSD). The external memory 234 may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a barometer sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, or an ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiments of the disclosure, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, and/or a control circuit for controlling them. The panel 262 may be implemented to be flexible, transparent, or wearable. The panel 262 may be configured with the touch panel 252 in one module. According to an embodiment of the present disclosure, the panel 262 may include a pressure sensor (or a "force sensor") capable of measuring a strength of a pressure by a user's touch. The pressure sensor may be implemented integrally with the touch panel 252 or may be implemented as one or more sensors separate from the touch panel 252. The hologram device 264 may show a stereoscopic image in the air by using interference of light. The projector 266 may display an image onto a screen through projection of light. The screen may be positioned inside or outside the electronic device 201. According to an embodiment, the interface 270 may include a high-definition multimedia interface (HDMI) 272, a universal serial bus (USB) 274, an optical interface 276, or a D-subminiature 278. The interface 270 may be included in the communication interface 170 illustrated in FIG. 1. Additionally or alternatively, the interface 270 may include, for example, an MHL interface, an SD card/MMC interface, or an IrDA interface.

The audio module 280 may bi-directionally convert sound and an electric signal. At least one element of the audio module 280 may be included in the input/output interface 150 illustrated in FIG. 1. The audio module 280 may process sound information input or output through the speaker 282, the receiver 284, the earphone 286, or the microphone 288. The camera module 291 may be, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 295 may manage power of the electronic device 201. According to an embodiment of the present disclosure, the power management module 295 may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electro-magnetic type, and for wireless charging, an additional circuit, for example, a coil loop, a resonance circuit, or a rectifier may be further included. The battery gauge may measure the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 may convert an electric signal into mechanical vibration or generate vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments of the present disclosure, some components of the electronic device (e.g., the electronic device 201) may be omitted or may further include other elements, and some of the components may be coupled to form one entity and identically perform functions of the components before being coupled.

Figure 3:
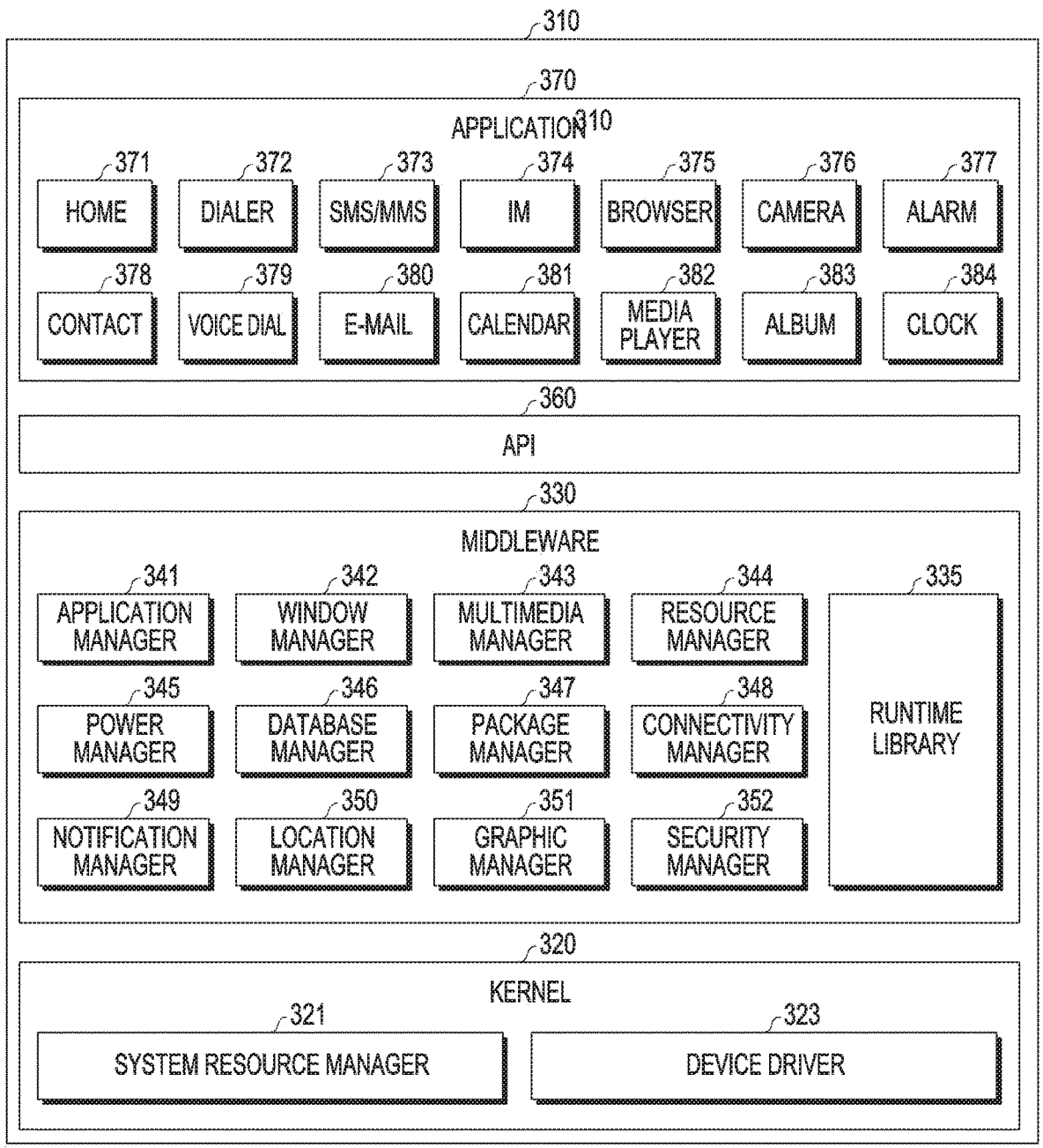
FIG. 3 is a block diagram of an electronic device according to various embodiments of the present disclosure.

FIG. 3 is a block diagram of a programming module according to various embodiments of the present disclosure. According to an embodiment of the present disclosure, a programming module 310 (e.g., the program 140) may include an OS for controlling resources associated with an electronic device (e.g., the electronic device 101) and/or various applications (e.g., the application program 147) executed on the OS. The OS may include Android™, iOS™, Windows™, Symbian™, Tizen™, or Bada™ Referring to FIG. 3, the programming module 310 may include a kernel 320 (e.g., the kernel 141), middleware 330 (e.g., the middleware 143), an application programming interface (API) 360 (e.g., the API 145), and/or an application 370 (e.g., the application program 147). At least a part of the programming module 310 may be preloaded on an electronic device or may be downloaded from an external device (e.g., the electronic device 102 or 104, or the server 106).

The kernel 320 may include a system resource manager 321 and/or a device driver 323. The system resource manager 321 may perform control, allocation, retrieval of system resources, and so forth. According to an embodiment of the present disclosure, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may include provide functions that the application 370 commonly requires or provide various functions to the application 370 through the API 360 to allow the application 370 to use a limited system resource in an electronic device. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module that a compiler uses to add a new function through a programming language while the application 370 is executed. The runtime library 335 performs input/output management, memory management, or calculation function processing. The application manager 341 may manage a life cycle of the applications 370. The window manager 342 may manage a graphic user interface (GUI) resource used in a screen. The multimedia manager 343 may recognize a format necessary for playing media files and perform encoding or decoding on a media file by using a codec appropriate for a corresponding format. The resource manager 344 may manage a source code or a memory space of the applications 370. The power manager 345 may manage, for example, a capacity, a temperature, or power of a battery and determine or provide power information necessary for an operation of the electronic device using corresponding information. According to an embodiment, the power manager 345 may operate with basic input/output system (BIOS). The database manager 346 may generate, search or change a database used for at least one application among the applications 370. The package manager 347 may manage the installation or update of an application distributed in a package file format.

The connectivity manager 348 may manage a wireless connection. The notification manager 349 may provide an event, e.g., an arriving message, an appointment, proximity notification, etc. The location manager 350 may manage location information about an electronic device. The graphic manager 351 may manage, for example, a graphic effect to be provided to a user or a user interface relating thereto. The security manager 352 may provide, for example, system security or user authentication. According to an embodiment of the present disclosure, the middleware 330 may further include a telephony manager for managing a voice or video call function of the electronic device or a middleware module forming a combination of functions of the above-described components. According to an embodiment of the present disclosure, the middleware 330 may provide a module specified for each type of an OS. Additionally, the middleware 330 may delete some of existing elements or add new elements dynamically. The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like). According to an embodiment, the application 370 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 370 may include an application (e.g., device health care application of mobile medical equipment) designated according to an attribute of the external electronic device. According to an embodiment, the application 370 may include an application received from the external electronic device. The at least a part of the programming module 310 may be implemented (e.g., executed) by software, firmware, hardware (e.g., the processor 210), or a combination of two or more of them, and may include, for example, modules, programs, routines, sets of instructions, or processes for performing one or more functions.

Figure 4:
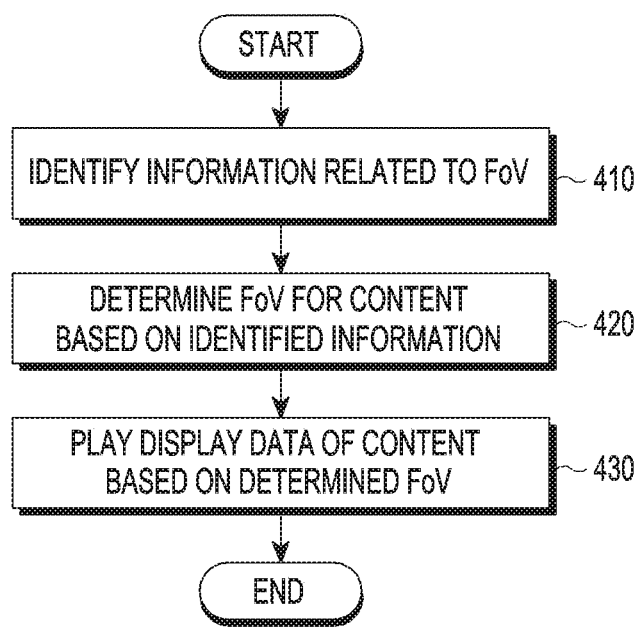
FIG. 4 is a flowchart of a method, performed by an electronic device, of playing content, according to various embodiments of the disclosure.

FIG. 4 is a flowchart of a method, performed by an electronic device, of displaying content, according to various embodiments of the disclosure.

In operation 410, a processor (e.g., the processor 120) of the electronic device 101 may identify information related to an FoV for the content. For example, the processor may identify the information related to the FoV when adjustment of the FoV is allowed for playback of the content according to a user's configuration. When adjustment of the FoV is not allowed for playback of the content, the processor may not identify information related to the FoV and may play display data of the content based on an FoV designated in the electronic device 101 or in an application used for playback of the content.

For example, the information related to the FoV for the content may include at least one of additional information related to the FoV for the content or configuration information related to the FoV. The processor may identify at least one of the additional information or the configuration information.

In operation 420, the processor may determine the FoV for the content based on the identified information. The processor may determine an optimal FoV for minimizing a loss in presence and relieving a symptom such as dizziness, giddiness, nausea, or the like the user may have, as the FoV for the content, in various ways by using the identified information. A detailed method of determining the FoV for the content will be described.

In operation 430, the processor may play the display data of the content by using a display (e.g., the display 160) based on the FoV for the content, which is determined in operation 420. For example, the processor may adjust the display data of the content based on the determined FoV and play the adjusted display data of the content by using the display. In another example, the processor may play designated image data overlappingly with the display data of the content in at least a region of the display, which is determined based on the determined FoV.

Figure 5A:
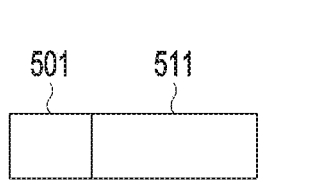
FIG. 5A illustrates a structure of meta data of content including additional information, according to various embodiments of the disclosure.
Figure 5A:
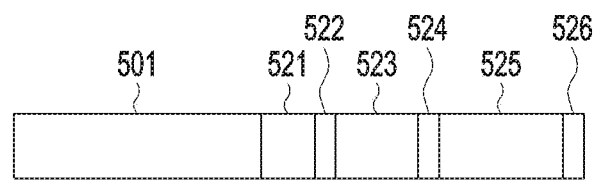

FIG. 5A illustrates a structure of meta data of content including additional information, according to various embodiments of the disclosure.

According to various embodiments of the disclosure, the additional information related to the FoV for the content may be included in meta data for the content. For example, the additional information may include information indicating an FoV, which is configured for the content, or information used to determine an FoV for the content.

When the additional information includes information indicating an FoV, which is configured for the content, information indicating attributes of the content may be stored in a first field 501 of meta data of the content and additional information indicating the FoV, which is configured for the content, may be stored in a second field 511 of the meta data of the content, as shown in FIG. 5A(a). A processor (e.g., the processor 120) of the electronic device 101 may identify the additional information based on information stored in the second field 511.

For example, when the additional information includes information used to determine the FoV for the content, the information indicating the attributes of the content may be stored in the first field 501 of the meta data of the content and information used to determine the FoV for the content may be stored in second through sixth fields 521, 522, 523, 524, 525, and 526 of the meta data of the content, respectively, as shown in FIG. 5A(b).

The information used to determine the FoV for the content may include at least one of information indicating whether the content is 2D content or 3D content, information indicating a type of the content, information indicating whether the content is an image or a video, information indicating whether the content provides an interface for interaction, or information about motion of at least one object included in the content. The information included in the information used to determine the FoV for the content may be stored in the second through sixth fields 521, 522, 523, 524, 525, and 526, respectively. The processor may identify the additional information related to the FoV based on the information stored in each of the second through sixth fields 521, 522, 523, 524, 525, and 526.

According to various embodiments of the disclosure, the electronic device 101 may identify the additional information shown in FIG. 5A through the display data of the content. For example, the processor may identify the additional information related to the FoV from the display data of the content to be played using the display (e.g., the display 160) of the electronic device 101. For example, the processor may identify from the display data of the content, at least one of information indicating whether the content is 2D content or 3D content, information indicating a type of the content, information indicating whether the content is an image or a video, information indicating whether the content provides an interface for interaction, or information about motion of at least one object included in the content.

According to various embodiments of the disclosure, the processor may identify the additional information related to the FoV through the display data of the content and determine the FoV for the content by using the identified additional information, even when the additional information is not included in the meta data of the content.

Figure 5B:
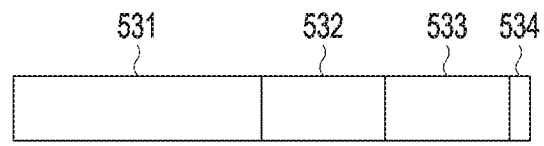
FIG. 5B illustrate a structure of data including configuration information of an electronic device 101, according to various embodiments of the disclosure.

FIG. 5B illustrate a structure of data including configuration information of the electronic device 101, according to various embodiments of the disclosure.

According to various embodiments of the disclosure, a processor (e.g., the processor 120) of the electronic device 101 may store data 520 including configuration information of the electronic device 101. The processor may identify the configuration information of the electronic device 101 based on the data 520.

For example, as shown in FIG. 5B, the data 520 may include configuration information of the electronic device 101, which is not related to the FoV, in a first field 531, and configuration information related to the FoV in a second field 532, a third field 533, and a fourth field 534.

For example, the configuration information related to the FoV of the electronic device 101 may include at least one of configuration information indicating whether screen switchover is possible according to movement of a head of the user, configuration information about a method of playing the display data of the content, or configuration information about a brightness used for playback of the display data of the content. The information included in the configuration information related to the FoV may be stored in the second field 532, the third field 533, and the fourth field 534, respectively. The processor may identify the configuration information related to the FoV based on the information stored in each of the second field 532, the third field 533, and the fourth field 534.

However, the above-described method for storing the additional information related to the FoV for the content or the configuration information related to the FoV of the electronic device 101 is merely an example for the purpose of description and the disclosure is not limited to the example, such that the additional information related to the FoV may be stored in at least a part of the data for the content in various ways and the configuration information related to the FoV may be stored in a memory (e.g., the memory 130) of the electronic device 101.

Figure 6:
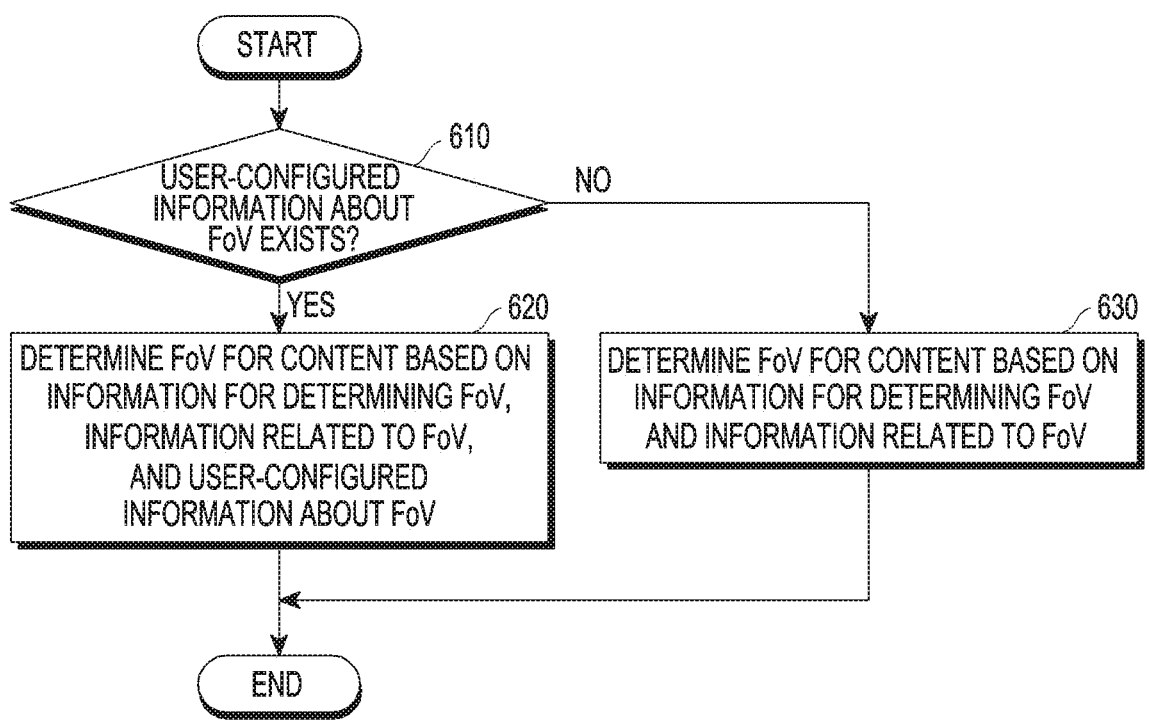
FIG. 6 is a flowchart illustrating a method, performed by an electronic device, of determining an FoV for content, according to various embodiments of the disclosure.

FIG. 6 is a flowchart illustrating a method, performed by an electronic device, of determining an FoV for content, according to various embodiments of the disclosure.

In operation 610, a processor (e.g., the processor 120) of the electronic device 101 may determine whether information about the FoV, which is configured by the user, exists. The processor may determine the FoV for the content by further using the user-configured information about the FoV to reflect personal characteristics of the user.

In operation 620, when the user-configured information about the FoV exists, the processor may determine the FoV for the content based on information for determining the FoV, stored in a memory (e.g., the memory 130) of the electronic device 101, the identified information related to the FoV, and the user-configured information about the FoV.

In operation 630, when the user-configured information about the FoV does not exist, the processor may determine the FoV for the content based on information for determining the FoV and the identified information related to the FoV.

For example, the information for determining the FoV, which is stored in the memory (e.g., the memory 130) of the electronic device 101, may include various information available for determining the FoV for the content based on the information related to the FoV or the user-configured information about the FoV, such as a mapping table shown in FIGS. 7A and 7B. Hereinbelow, a description will be made of a method of determining the FoV for the content based on a mapping table used as the information for determining the FoV, but the disclosure is not limited thereto, such that various methods may be used to determine an optimal FoV for the content.

FIGS. 7A and 7B illustrate a mapping table for determining an FoV, according to various embodiments of the disclosure.

According to various embodiments of the disclosure, the mapping table for determining the FoV may be configured in various ways to determine the FoV. For example, one mapping table may be used as shown in FIG. 7A, and a plurality of mapping tables may be used for the additional information or configuration information related to the FoV, which is included in the information related to the FoV for the content, as shown in FIG. 7B.

For example, referring to FIGS. 7A and 7B, the additional information and the configuration information may be classified into a plurality of types according to information included in each of them. The additional information may be classified into nine types as shown in FIG. 7A or seven types as shown in FIG. 7B(a).

Based on the information included in the additional information, for example, at least one of information indicating whether the content is 2D content or 3D content, information indicating a type of the content, information indicating whether the content is an image or a video, information indicating whether the content provides an interface for interaction, or information about motion of at least one object included in the content, the additional information may be classified into a plurality of types.

The configuration information may be classified into nine types as shown in FIG. 7A or seven types as shown in FIG. 7B(b). For example, based on the information included in the configuration information, for example, at least one of configuration information indicating whether screen switchover is possible according to movement of a head of the user, configuration information about a method of playing the display data of the content, or configuration information about a brightness used for playback of the display data of the content, the configuration information related to the FoV of the electronic device 101 may be classified into a plurality of types.

According to various embodiments of the disclosure, the processor may determine which type among the plurality of types for the additional information included in the identified information related to the FoV the additional information corresponds to. According to various embodiments of the disclosure, the processor may determine which type among the plurality of types for the configuration information included in the identified information related to the FoV the configuration information corresponds to. The processor may identify the FoV corresponding to the additional information or the configuration information included in the information related to the FoV, based on a result of the determination.

For example, as shown in FIGS. 7A and 7B, when the mapping table is used as the information for determining the FoV, the processor may determine that the additional information included in the information related to the FoV corresponds to a type 3 among the plurality of types for the additional information and the configuration information included in the information related to the FoV of the electronic device 101 corresponds to a type 5 among the plurality of types. The processor may determine that the FoV for the content is "A" by using the mapping table of FIG. 7A based on a result of determination. The processor may determine the FoV for the content by applying an FoV identified from the mapping table shown in FIG. 7B(b), "E", to an FoV identified from the mapping table shown in FIG. 7B(a), "C", based on a result of determination.

In another example, the processor may identify the FoV corresponding to one of the additional information and the configuration information included in the information related to the FoV, based on the mapping table. For example, the processor may determine from the mapping table shown in FIG. 7B(a), the FoV corresponding to the additional information included in the information related to the FoV, "C", as the FoV for the content. In another example, the processor may determine from the mapping table shown in FIG. 7B(b), the FoV corresponding to the configuration information, "E", as the FoV for the content.

According to various embodiments of the disclosure, when information about an FoV, which is configured by the user, exists, the processor may determine the FoV for the content by further using the user-configured information about the FoV. For example, when an FoV identified from the information related to the FoV and the mapping table is "A" and an FoV adjustment rate included in the user-configured information about the FoV is a first rate, then the processor may determine the FoV for the content by adjusting the identified FoV "A" at the first rate. However, this is merely for the purpose of description without limiting the disclosure thereto, such that the user-configured information about the FoV may be used in various ways.

FIG. 7C is a diagram for describing a method of using information about an FoV for content, which is configured by a plurality of users, according to various embodiments of the disclosure.

For example, the user-configured information about the FoV may further include not only the user-configured information about the FoV for the content, but also information about the FoV, which is configured for the content by other users 710, 711, and 712 watching the content.

For example, the information configured by the other users 710, 711, and 712 for the content may be received from a server 720 that manages a plurality of contents. The information configured by the other users 710, 711, and 712 for the content may be stored in relation to each of the plurality of contents in the server 720 and received together during reception of the content. In another example, the information about the FoV, which is configured for the content by the other users 710, 711, and 712, may be received from the server at the request of the user of the electronic device 101. A processor (e.g., the processor 120) of the electronic device 101 may use the information about the FoV, which is configured by the other users 710, 711, and 712 for the content and received from the server 720, as the user-configured information about the FoV to determine the FoV for the content.

In another example, the server 720 may calculate the FoV for the content based on the information about the FoV, which is configured by the other users 710, 711, and 712 for the content, and store information about the calculated FoV in relation to the content. When transmitting the content to the electronic device 101, the server 720 may transmit the information about the calculated FoV, which is stored in relation to the content, to the electronic device 101. In another example, when the user of the electronic device 101 requests the information about the calculated FoV, the server 720 may transmit the information about the calculated FoV to the electronic device 101. The server 720 may determine information about the calculated FoV per content and store the information about the calculated FoV in relation to corresponding content. The processor may use the information about the calculated FoV, which is received from the server 720, as the user-configured information about the FoV to determine the FoV for the content.

Figure 8A:
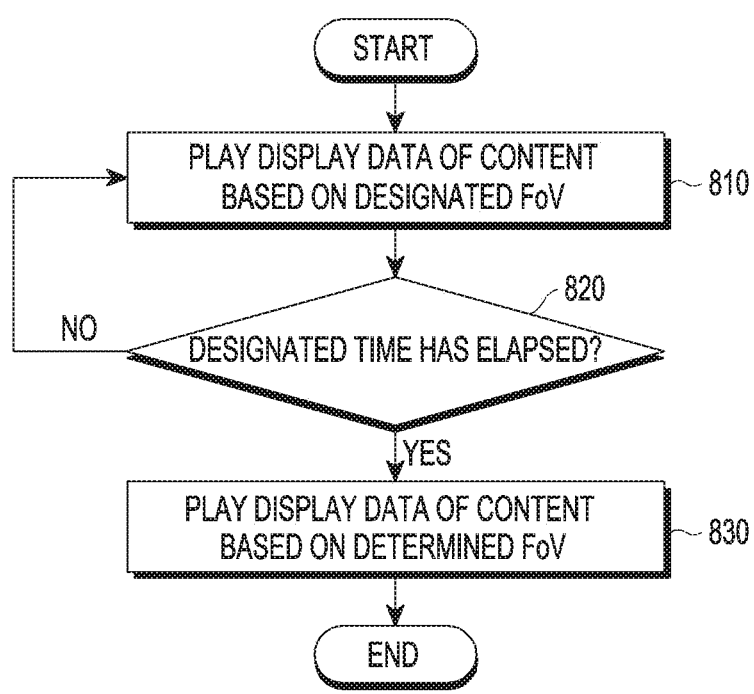
FIGS. 8A and 8B are flowcharts illustrating a method, performed by an electronic device, of playing display data of content based on a determined FoV, according to various embodiments of the disclosure.

FIG. 8A is a flowchart illustrating a method, performed by an electronic device, of playing display data of content based on a determined FoV, according to various embodiments of the disclosure.

In operation 810, a processor (e.g., the processor 120) of the electronic device 101 may play display data of content based on a designated FoV by using a display (e.g., the display 160) of the electronic device 101. The designated FoV may be designated in relation to the electronic device 101 or an application used to play the content.

In operation 820, after playing the display data of the content based on the designated FoV, the processor may determine whether a designated time has elapsed. To minimize a loss of presence the user may feel, the processor may determine whether the designated time has elapsed before playing the display data of the content based on the determined FoV.

Figure 9A:
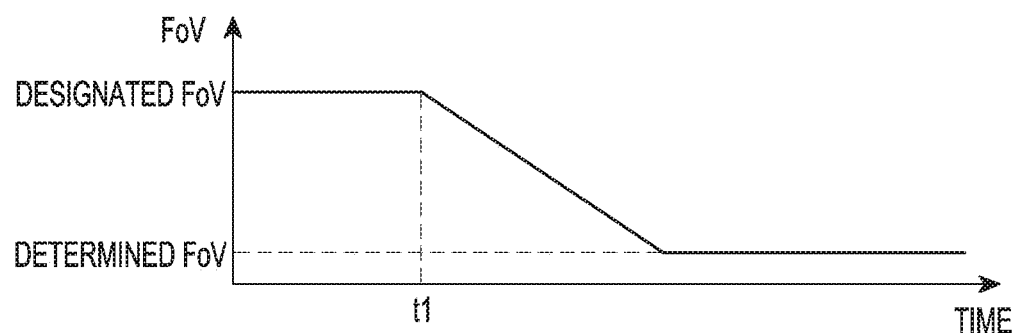
FIGS. 9A through 9D are graphs showing a change in an FoV for content according to various embodiments of the disclosure.
Figure 9B:
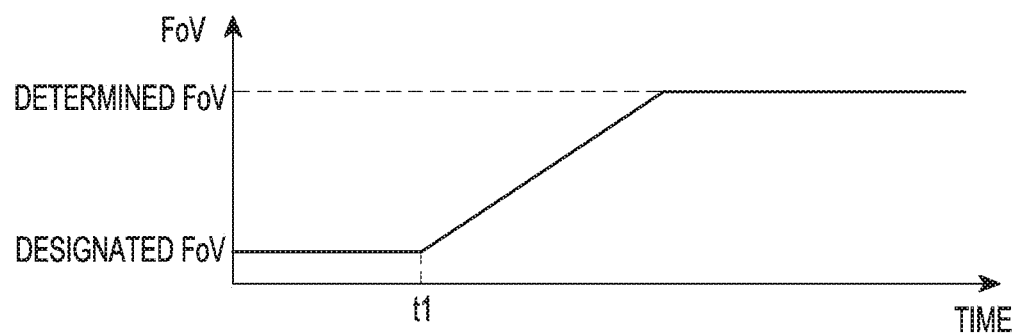

In operation 830, the processor may play the display data of the content based on the determined FoV by using the display, after an elapse of the designated time. As shown in FIGS. 9A and 9B, the processor may adjust the FoV for the content gradually from the designated FoV to the determined FoV. For example, as shown in FIG. 9A, when the designated FoV is greater than the determined FoV, after an elapse of a designated time t1, the processor may reduce the FoV for the content gradually from the designated FoV to the determined FoV. In another example, as shown in FIG. 9B, when the designated FoV is less than the determined FoV, after an elapse of the designated time t1, the processor may increase the FoV for the content gradually from the designated FoV to the determined FoV.

Figure 8B:
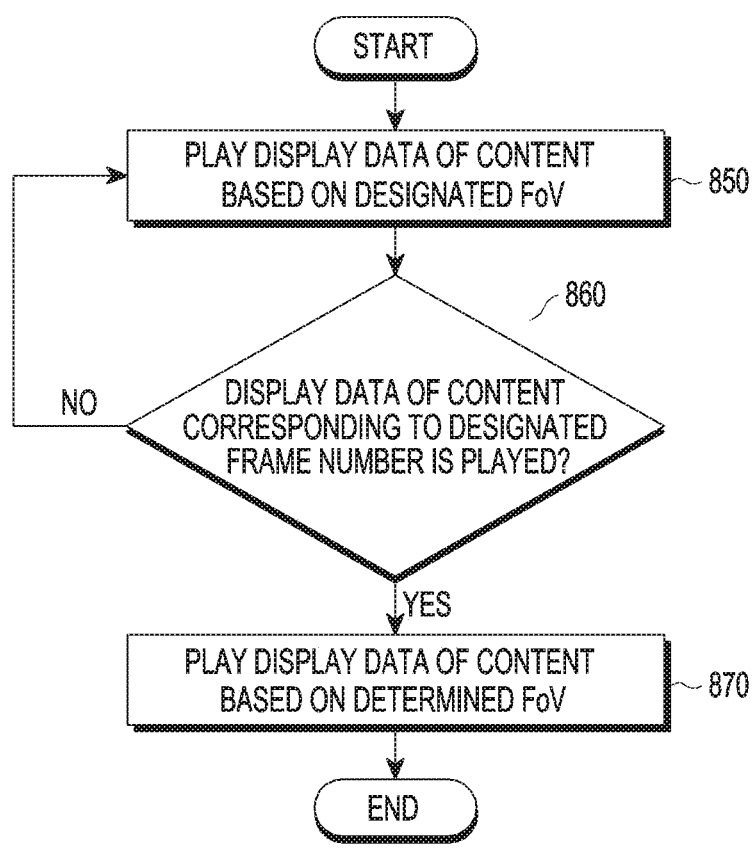

FIG. 8B is a flowchart illustrating a method, performed by an electronic device, of playing display data of content based on a determined FoV, according to various embodiments of the disclosure.

In operation 850, a processor (e.g., the processor 120) of the electronic device 101 may play display data of content based on a designated FoV by using a display (e.g., the display 160) of the electronic device 101.

In operation 860, the processor may determine whether display data of the content corresponding to a designated frame number is played, based on the designated FoV. To minimize a loss of presence the user may feel, the processor may determine whether the display data of the content corresponding to the designated frame number is played, based on the designated FoV, before playing the display data of the content based on the determined FoV.

Figure 9C:
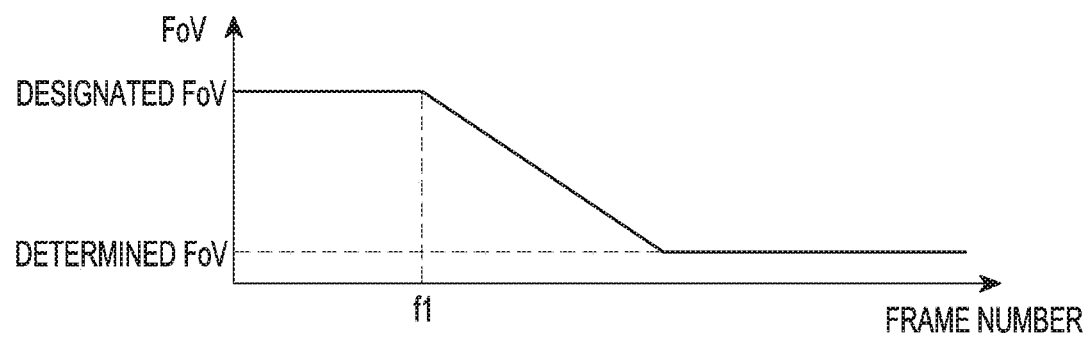
Figure 9D:
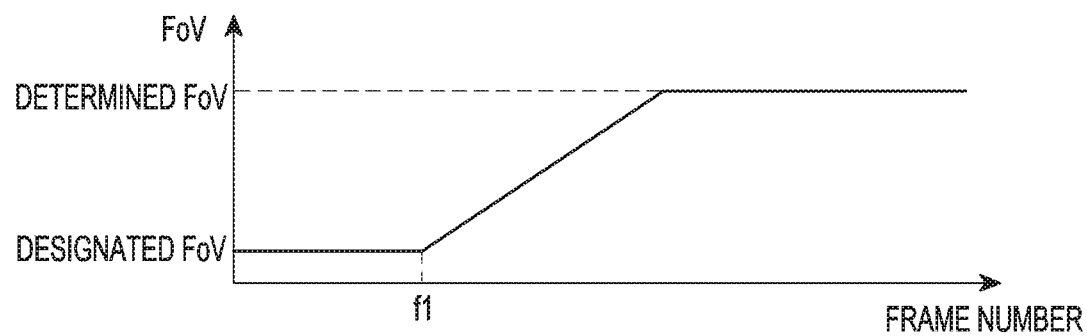

In operation 870, the processor may play the display data of the content based on the determined FoV by using the display, after playback of the display data, which corresponds to a designated frame number, of the content based on the designated FoV. As shown in FIGS. 9C and 9D, the processor may adjust the FoV for the content gradually from the designated FoV to the determined FoV. For example, as shown in FIG. 9C, when the designated FoV is greater than the determined FoV, after playback of the display data of the content corresponding to the designated time f1 based on the designated FoV, the processor may reduce the FoV for the content gradually from the designated FoV to the determined FoV. In another example, as shown in FIG. 9D, when the designated FoV is less than the determined FoV, after playback of the display data of the content corresponding to the designated time f1 based on the designated FoV, the processor may increase the FoV for the content gradually from the designated FoV to the determined FoV.

Figure 10:
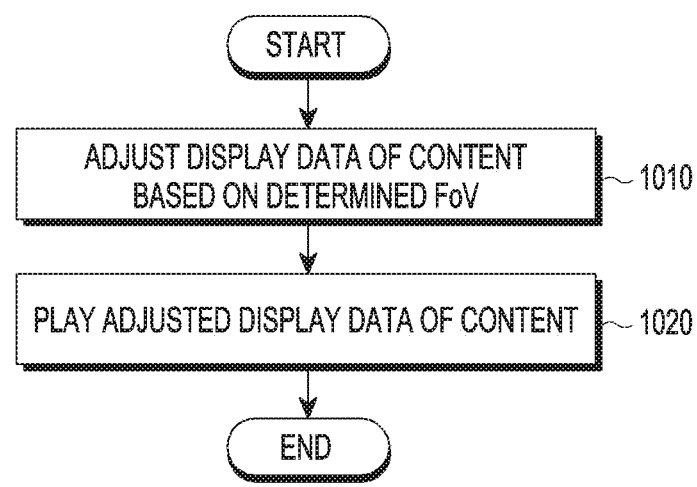
FIG. 10 is a flowchart illustrating a method, performed by an electronic device, of playing display data of content based on a determined FoV, according to various embodiments of the disclosure.

FIG. 10 is a flowchart illustrating a method, performed by an electronic device, of playing display data of content based on a determined FoV, according to various embodiments of the disclosure.

In operation 1010, a processor (e.g., the processor 120) of the electronic device 101 may adjust the display data of the content based on the determined FoV. For example, the processor may adjust the display data of the content based on the determined FoV, so that a height of a screen displayed through the display (e.g., the display 160) of the electronic device 101 at a designated rate is adjusted.

In operation 1020, the processor may play the adjusted display data of the content by using the display.

FIGS. 11A through 11F are diagrams for describing a method, performed by an electronic device, of adjusting display data of content based on a determined FoV, according to various embodiments of the disclosure.

Figure 11A:
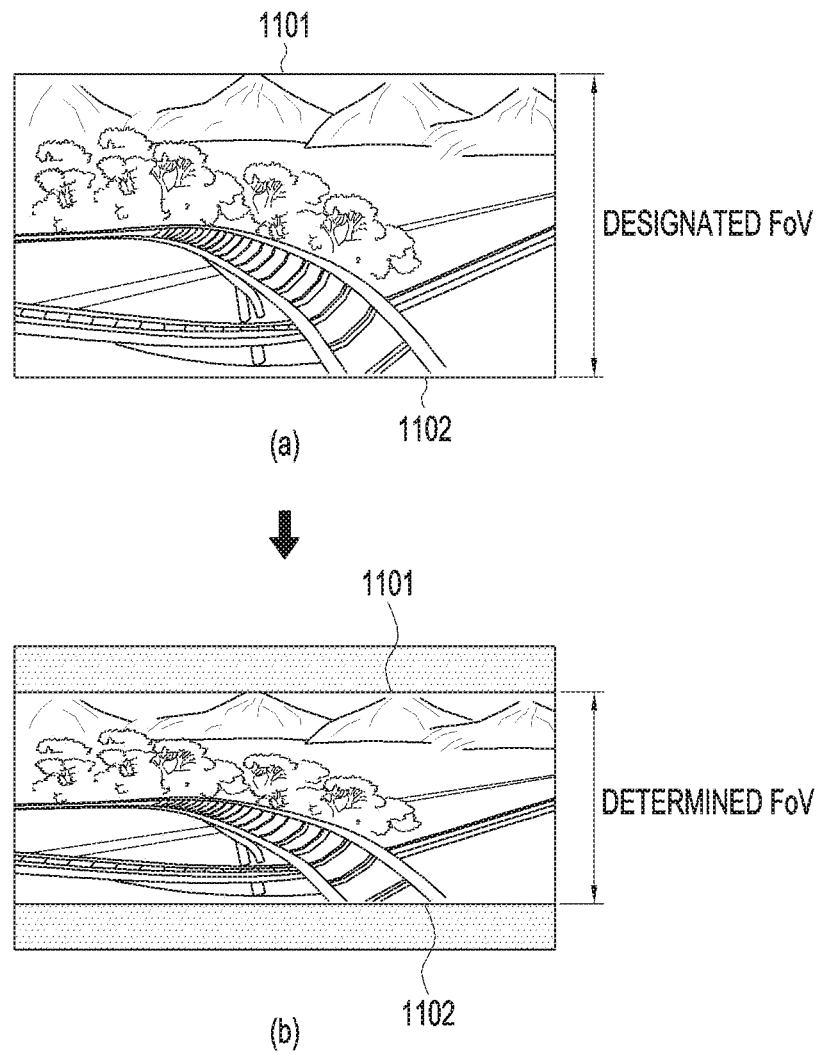
FIGS. 11A through 11F are diagrams for describing a method, performed by an electronic device, of adjusting display data of content based on a determined FoV, according to various embodiments of the disclosure.

For example, FIG. 11A(a) illustrates a first screen displayed through the display as the display data of the content is played based on a designated FoV. FIG. 11A(b) illustrates a second screen obtained by adjusting a height of the first screen at the same rate for top and bottom and displayed through the display (for example, adjusting a display position of a top end 1101 of the first screen and a display position of a bottom end 1102 of the first screen at the same rate), as the adjusted display data of the content is played based on the determined FoV.

The processor may adjust the display data of the content based on the determined FoV such that the height of the first screen displayed based on the designated FoV is adjusted at the same rate for top and bottom, like in the second screen.

Figure 11B:
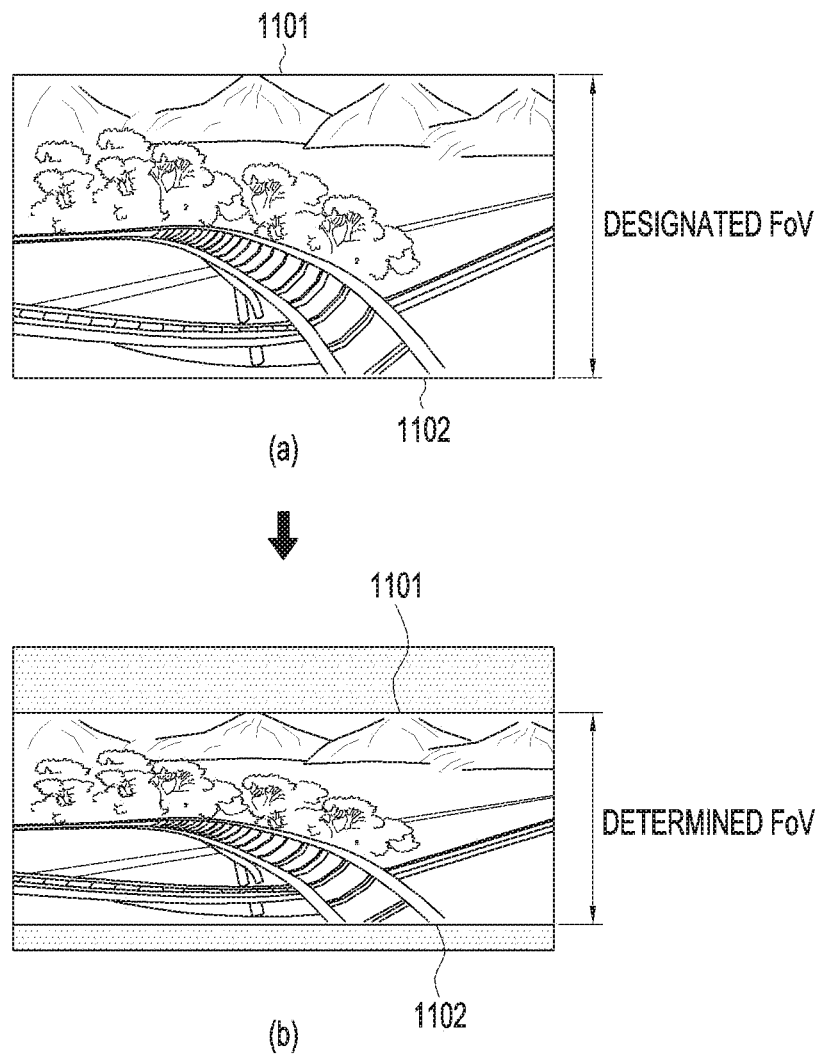

In another example, FIG. 11B(a) illustrates a first screen displayed through the display as the display data of the content is played based on the designated FoV. FIG. 11B(b) illustrates a third screen obtained by adjusting the height of the first screen at a designated rate and displayed through the display, as the adjusted display data of the content is played based on the determined FoV. For example, the designated rate may be designated to reflect human visual characteristics, and like in the third screen, the height of the screen may be adjusted at different rates for top and bottom based on the designated rate (for example, the display position of the top end 1101 of the first screen and the display position of the bottom end 1102 of the first screen are adjusted at different rates).

The processor may adjust the display data of the content based on the determined FoV such that the height of the first screen displayed based on the designated FoV is adjusted at the designated rate, like in the third screen.

Figure 11C:
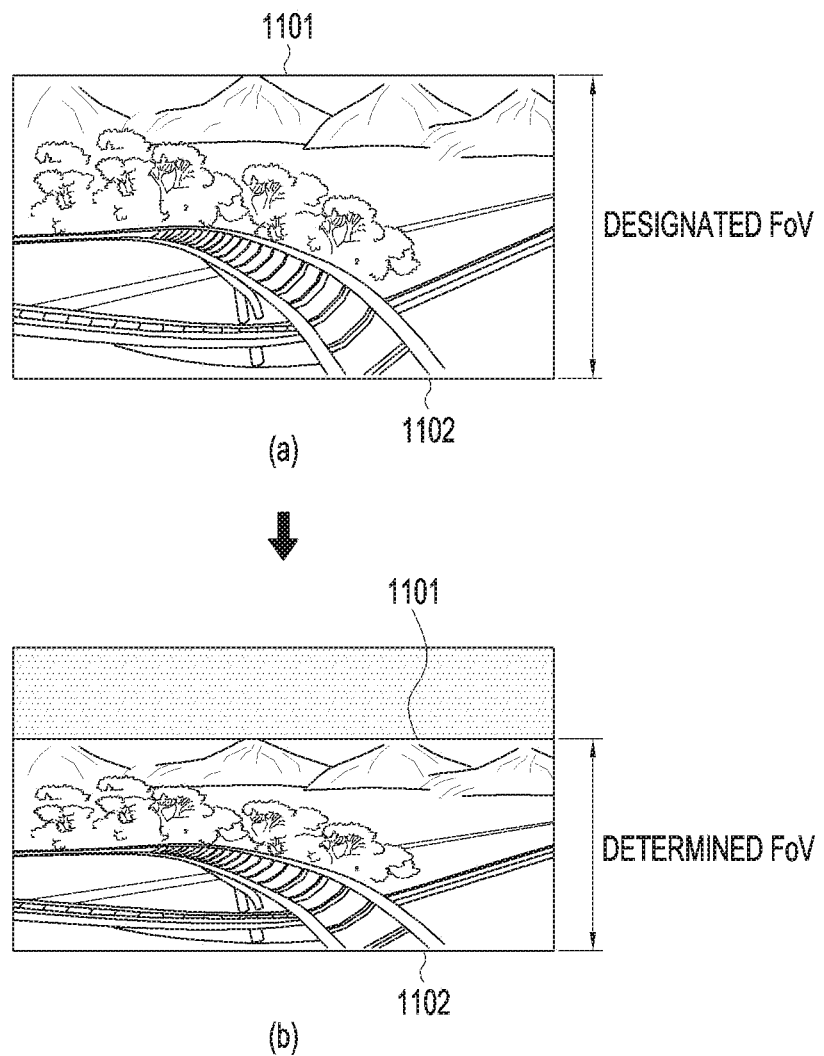

In another example, FIG. 11C(a) illustrates a first screen displayed through the display as the display data of the content is played based on the designated FoV. FIG. 11C(b) illustrates a fourth screen obtained by adjusting the height of the first screen and displayed through the display, as the adjusted display data of the content is played based on the determined FoV. Like in the fourth screen, the height of the first screen may be adjusted with respect to the bottom end 1102 of the first screen (e.g., the display position of the bottom end 1102 of the first screen may be fixed and the display position of the top end 1101 of the first screen may be adjusted toward the bottom end 1102 of the first screen).

The processor may adjust the display data of the content based on the determined FoV such that the height of the first screen displayed based on the designated FoV is adjusted with respect to the bottom end 1102 of the first screen, like in the fourth screen.

Figure 11D:
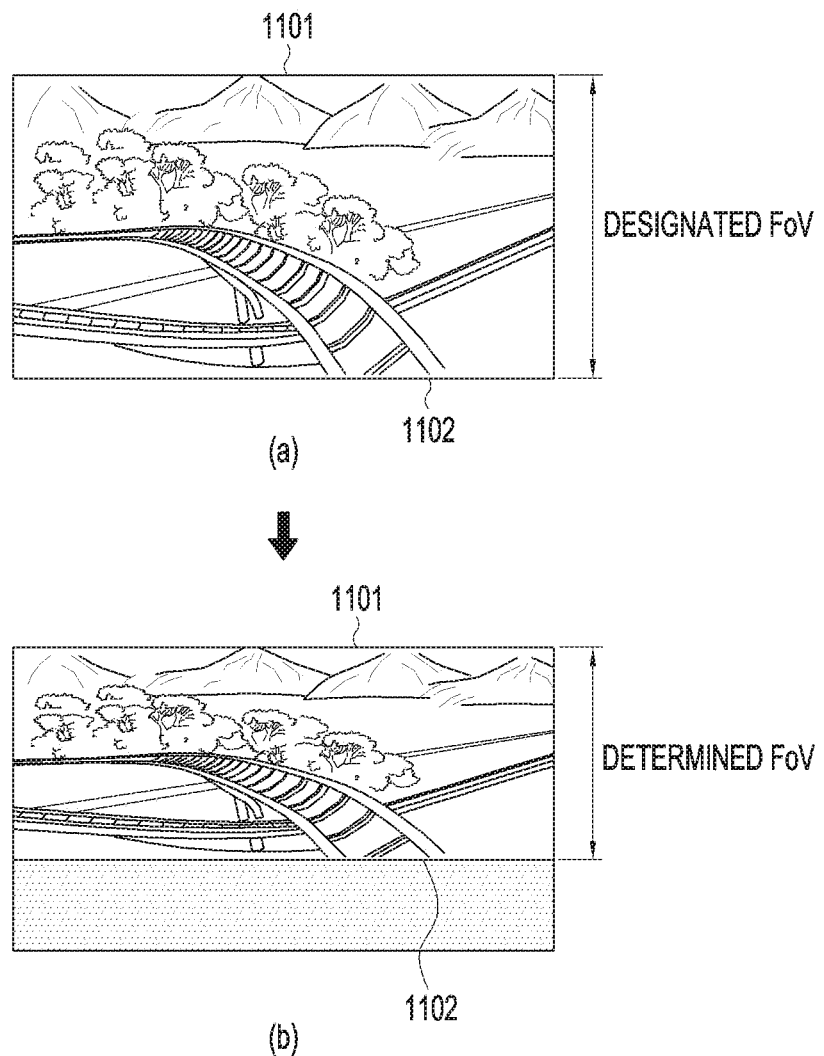

In another example, FIG. 11D(a) illustrates the first screen displayed through the display as the display data of the content is played based on the designated FoV. FIG. 11D(b) illustrates a fifth screen obtained by adjusting the height of the first screen and displayed through the display, as the adjusted display data of the content is played based on the determined FoV. Like in the fifth screen, the height of the first screen may be adjusted with respect to the top end 1101 of the first screen (e.g., the display position of the top end 1101 of the first screen may be fixed and the display position of the bottom end 1102 of the first screen may be adjusted toward the top end 1101 of the first screen).

The processor may adjust the display data of the content based on the determined FoV such that the height of the first screen displayed based on the designated FoV is adjusted with respect to the top end 1102 of the first screen, like in the fifth screen.

Figure 11E:
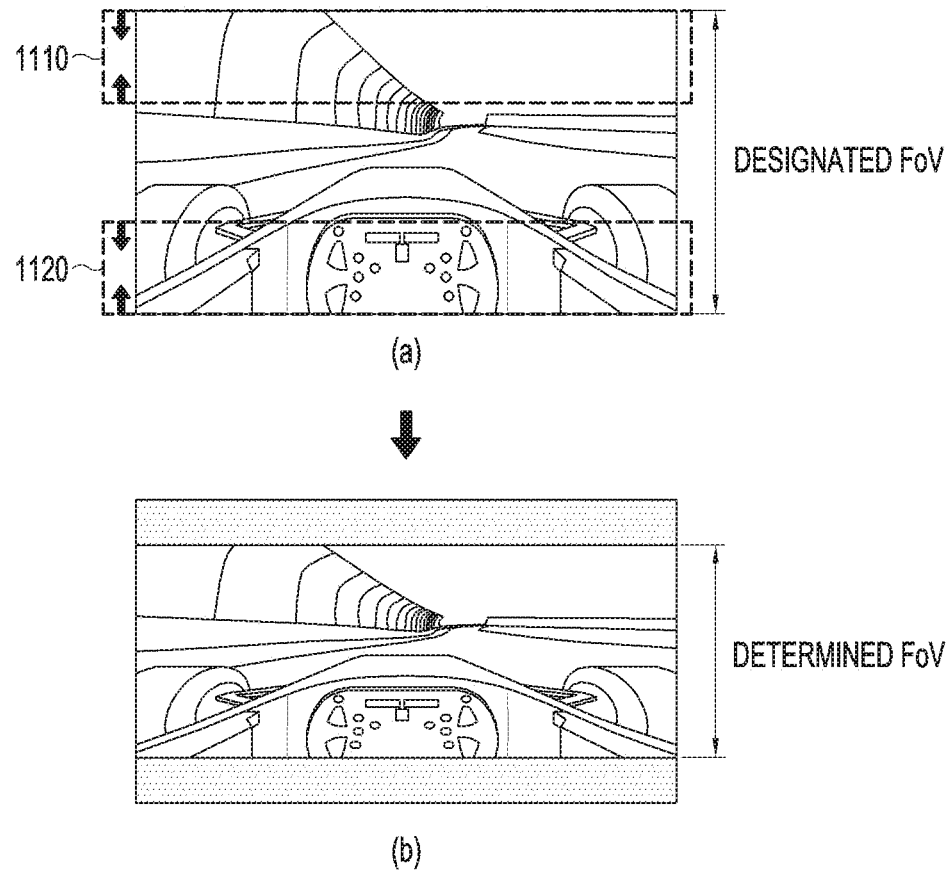

In another example, FIG. 11E(a) illustrates a sixth screen displayed through the display as the display data of the content is played based on the designated FoV. FIG. 11E(b) illustrates a seventh screen obtained by adjusting the height of the first screen and displayed through the display, as the adjusted display data of the content is played based on the determined FoV. Like in the seventh screen, by adjusting heights of a first part 1110 and a second part 1120 of the first screen, the height of the first screen may be adjusted.

The processor may adjust the display data of the content based on the determined FoV such that the height of the first screen may be adjusted by adjusting the heights of the first part 1110 and the second part 1120 of the first screen, like in the seventh screen.

Figure 11F:
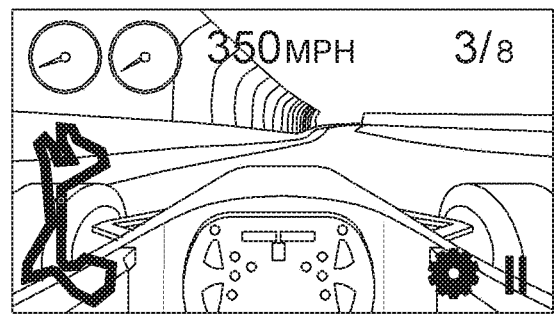
Figure 11F:
Figure 11F:
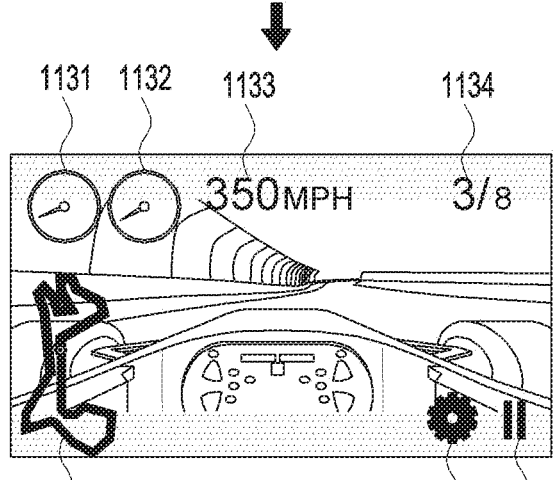

In another example, FIG. 11F(a) illustrates an eighth screen displayed through the display as the display data of the content is played based on the designated FoV. FIG. 11F(b) illustrates a ninth screen obtained by adjusting the height of the first screen and displayed through the display, as the adjusted display data of the content is played based on the determined FoV. Like in the ninth screen, even when the height of the first screen is adjusted, heights of a plurality of graphic objects 1131, 1132, 1133, 1134, 1135, 1136, and 1137 included in the first screen may not be adjusted.

The processor may adjust the display data of the content based on the determined FoV, such that like in the ninth screen, even when the height of the first screen is adjusted, heights of a plurality of graphic objects 1131, 1132, 1133, 1134, 1135, 1136, and 1137 included in the first screen are not adjusted.

Figure 12:
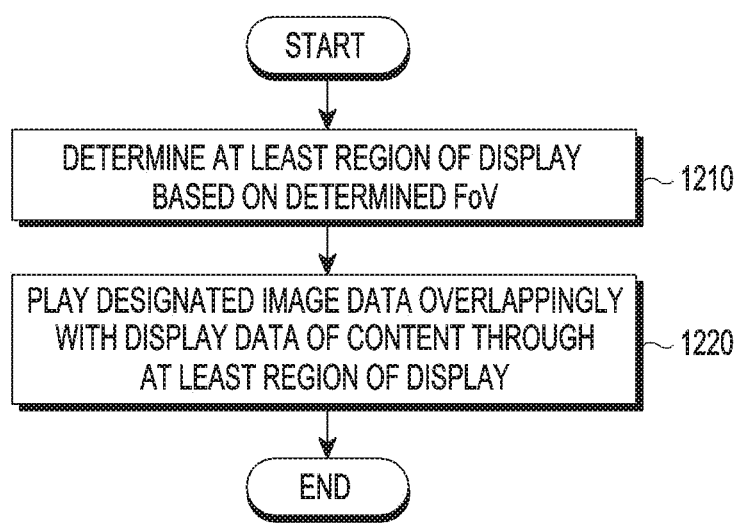
FIG. 12 is a flowchart illustrating a method, performed by an electronic device, of playing display data of content based on a determined FoV, according to various embodiments of the disclosure.

FIG. 12 is a flowchart illustrating a method, performed by an electronic device, of playing display data of content based on a determined FoV, according to various embodiments of the disclosure.

In operation 1210, a processor (e.g., the processor 120) of the electronic device 101 may determine at least a region of a display (e.g., the display 160) of the electronic device 101, based on a determined FoV. For example, the processor may determine the at least a region of the display such that a region other than the determined at least a region from the entire region of the display corresponds to the determined FoV.

In operation 1220, the processor may play designated image data overlappingly with the display data of the content in the at least a region of the display.

Figure 13A:
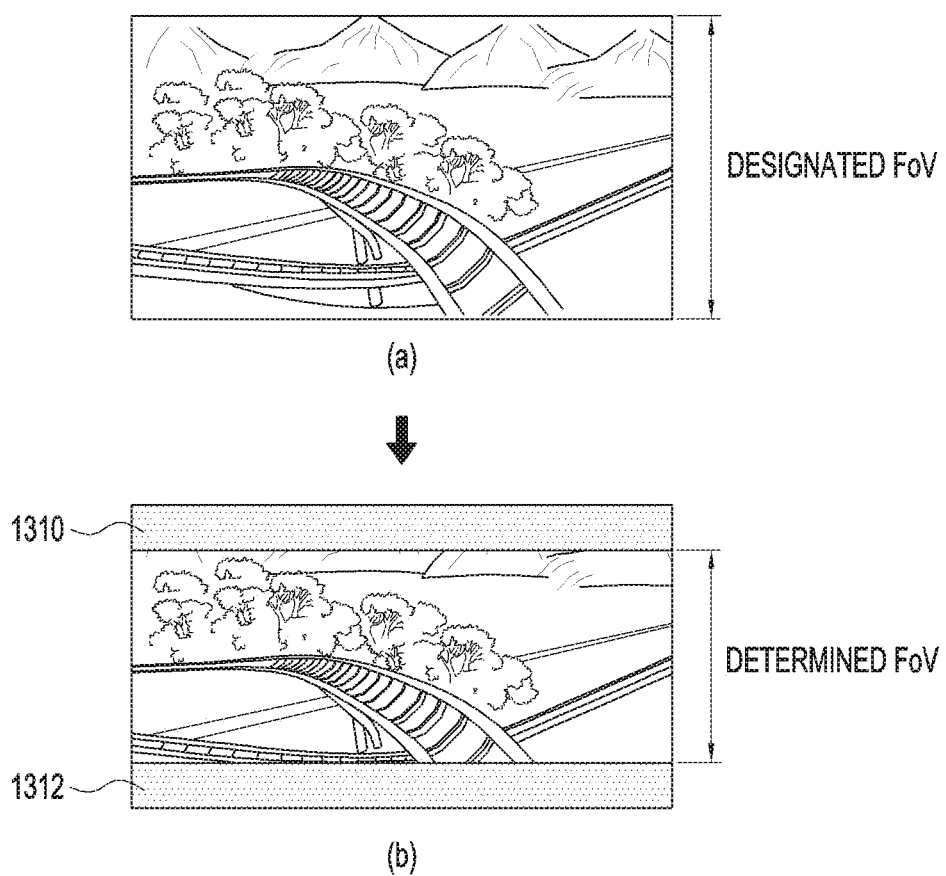
FIGS. 13A and 13B are diagrams for describing a method, performed by an electronic device, of playing image data overlappingly on display data of content, according to various embodiments of the disclosure.
Figure 13B:
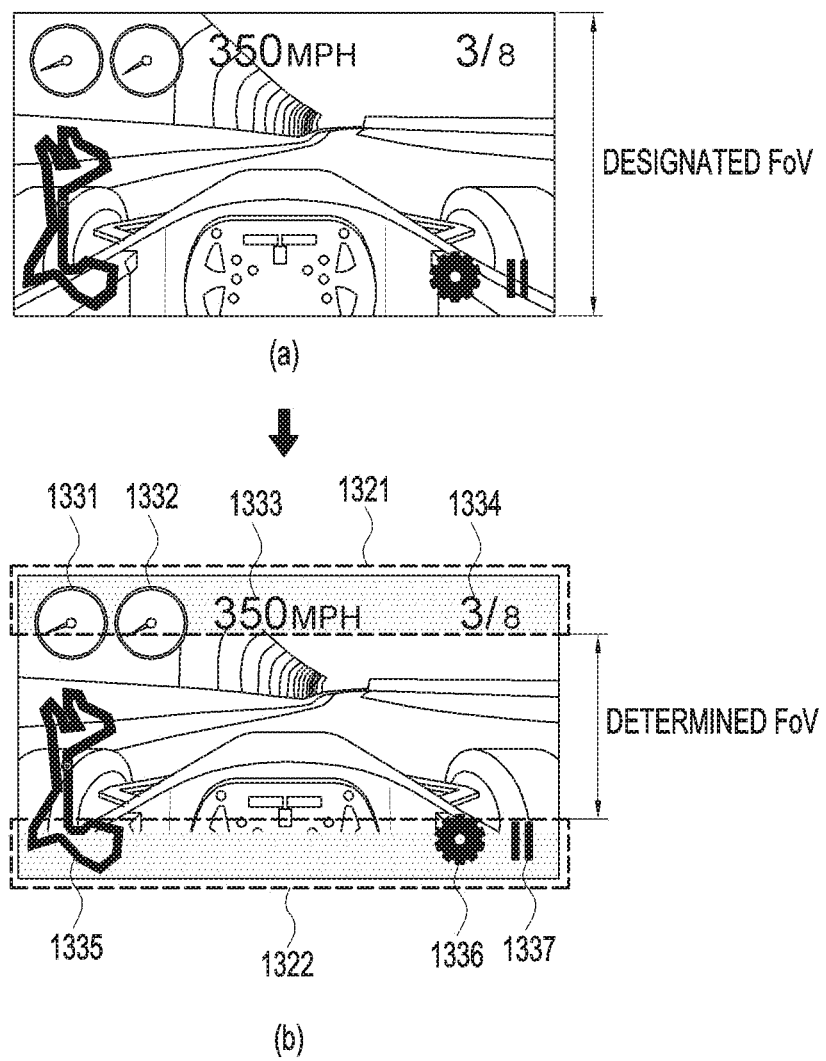

FIGS. 13A and 13B are diagrams for describing a method, performed by an electronic device, of playing image data overlappingly on display data of content, according to various embodiments of the disclosure.

For example, FIG. 13A(a) illustrates the first screen displayed through the display as the display data of the content is played based on a designated FoV. FIG. 13A(b) illustrates the second screen displayed through the display as designated image data is played overlappingly with the display data of the content in regions 1310 and 1312 of the display determined based on the determined FoV. As the designated image data is played overlappingly with the display data of the content like in the second screen, the user may not perceive a part of the first screen corresponding to the regions 1310 and 1312 of the display. Various available image data may be used to prevent the user from perceiving the part of the first screen through the regions 1310 and 1312.

In another example, the processor may adjust the display data of the content based on the determined FoV such that at least a part of the first screen displayed based on the designated FoV is shaded. For example, the processor may adjust the display data of the content based on the determined FoV such that a plurality of parts of the first screen are shaded, like in the second screen. The plurality of parts of the first screen to be shaded may be determined based on the determined FoV.

For example, the at least a region of the display in which the image data is displayed overlappingly with the display data of the content may be designated as a plurality of regions as shown in FIG. 13A, or may be designated as one region with respect to the top end or the bottom end of the display. In another example, when the at least a region of the display is designated as a plurality of regions as shown in FIG. 13A, a height of each region may be the same, or the height of each region may be different according to a rate designated to reflect human visual characteristics as described with reference to FIG. 11B.

In another example, FIG. 13B(a) illustrates the third screen displayed through the display as the display data of the content is played based on the designated FoV. FIG. 13B(b) illustrates the second screen displayed through the display as designated image data is played overlappingly with the display data of the content in regions 1321 and 1322 of the display determined based on the determined FoV. Like in the fourth screen, even when the designated image data is played overlappingly with the display data of the content, a plurality of graphic objects 1331, 1332, 1333, 1334, 1335, 1336, and 1337 included in the first screen may be displayed overlappingly with the image data.

As the designated image data is played overlappingly with the display data of the content, the user may not be able to perceive a part of the first screen corresponding to the regions 1321 and 1322 of the display, but may be able to perceive the plurality of graphic objects 1331, 1332, 1333, 1334, 1335, 1336, and 1337 because they are displayed overlappingly with the image data.

Figure 14:
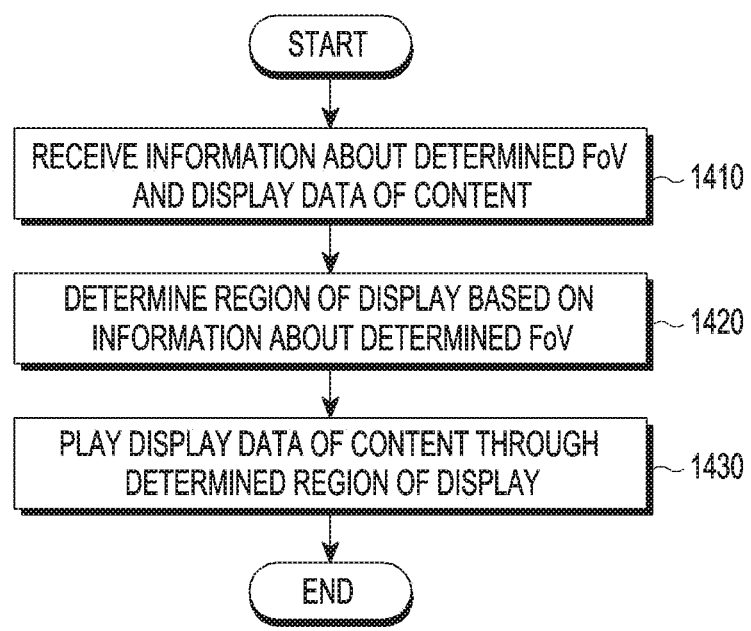
FIG. 14 is a flowchart illustrating a method, performed by an electronic device, of playing content based on a determined FoV, according to various embodiments of the disclosure.

FIG. 14 is a flowchart illustrating a method, performed by an electronic device, of playing display data of content based on a determined FoV, according to various embodiments of the disclosure.

In operation 1410, a display (e.g., the display 160) of the electronic device 101 may receive information about the determined FoV and the display data of the content from a processor (e.g., the processor 120) of the electronic device 101. The processor may deliver the information about the determined FoV and the display data of the content to the display without adjusting the display data of the content based on the determined FoV.

In operation 1420, the display may determine a region of the display for playing the display data of the content, based on the information about the determined FoV.

For example, the display may determine the region of the display by further using a designated rate for reflecting human visual characteristics.

In operation 1430, the display may play the display data of the content through the determined region of the display. The display may play the display data of the content through the region of the display and may not play the display data of the content through other regions of the display than the region of the display.

Figure 15:
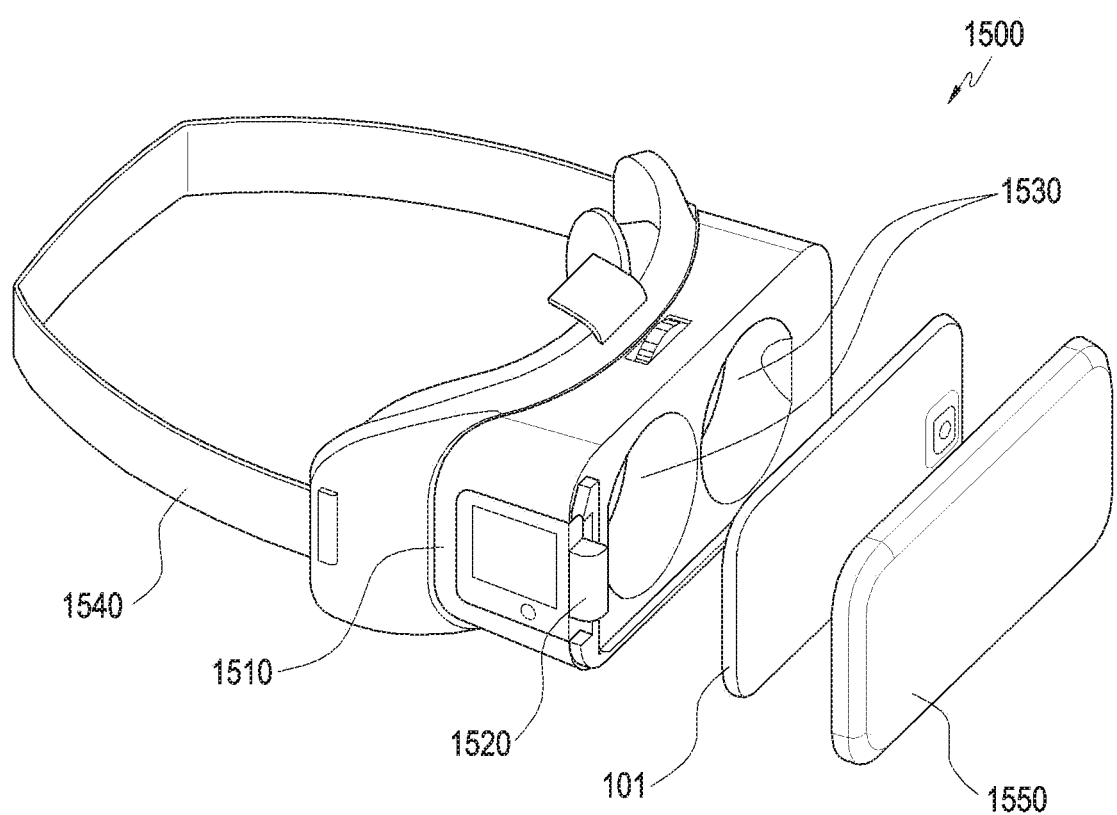
FIG. 15 illustrates a head-mounted electronic device according to various embodiments of the disclosure.

FIG. 15 illustrates a head-mounted electronic device according to various embodiments of the disclosure.

According to various embodiments of the disclosure, a head-mounted electronic device 1500 may include a frame 1510, an interface 1520, at least one lens 1530, a mounting portion 1540, a cover 1550, a driving unit (not shown), and a processor (not shown).

According to various embodiments of the disclosure, the frame 1510 may be structured such that the electronic device 101 is mountable on and demountable from the frame 1510. Thus, the user may mount the electronic device 101 on the frame 1510 and may watch content displayed through a display of the electronic device 101.

According to various embodiments of the disclosure, the interface 1520 may be arranged on a side of the frame 1510 and perform communication with the electronic device 101 in connection with the electronic device 101.

According to various embodiments of the disclosure, the at least one lens 1530 may be arranged to be movable in the frame 1510, and a focus of the at least one lens 1530 may be adjusted according to applied electric current. The driving unit may be arranged in the frame 1510 and move the at least one lens 1530 in the frame 1510.

According to various embodiments of the disclosure, the mounting portion 1540 may be connected with the frame 1510 and may be structured to be fixed in a part of a body of the user. The cover 1550 may be structured to fix the electronic device 101 in the frame 1510.

According to various embodiments of the disclosure, the processor may be arranged in the frame 1510 and control components included in the head-mounted electronic device 1500.

According to various embodiments of the disclosure, the processor may receive information related to an FoV for content from the electronic device 101 through the interface 1520. The processor may determine the FoV for the content based on the received information. A detailed method of determining the FoV is the same as a method described above, and thus will not be described separately. In another example, the processor may receive the information about the FoV determined by the electronic device 101 from the electronic device 101. In this case, the processor may not separately perform determination of the FoV.

According to various embodiments of the disclosure, the processor may move the at least one lens 1530 or adjust the focus of the at least one lens 1530, based on the determined FoV. The processor may adjust the focus of the at least one lens 1530 while moving the at least one lens 1530 or may move the at least one lens 1530 without adjusting the focus of the at least one lens 1530. In another example, the processor may adjust the focus of the at least one lens 1530 while fixing the position of the at least one lens 1530.

For example, the processor may control the driving unit to move the at least one lens 1530 to a position determined based on the determined FoV. In another example, the processor may apply current to the at least one lens 1530 such that the focus of the at least one lens 1530 is adjusted to a focus determined based on the determined FoV.

Figure 16:
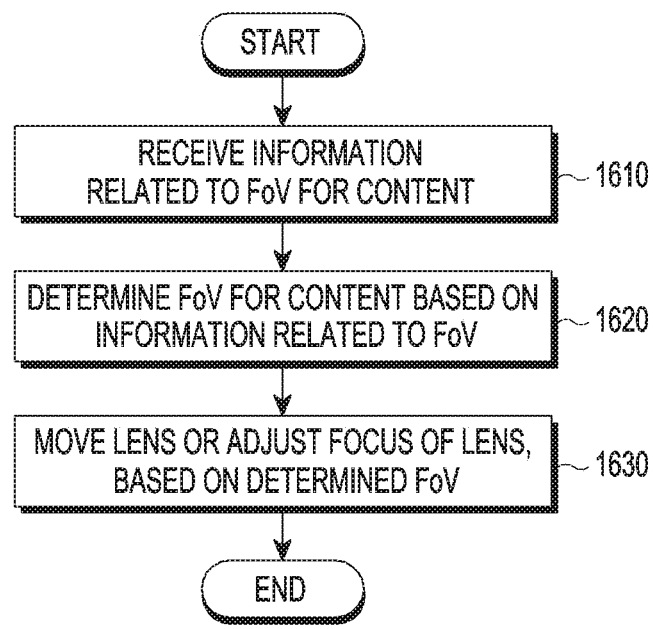
FIG. 16 is a flowchart illustrating an operation method of a head-mounted electronic device, according to various embodiments of the disclosure.

FIG. 16 is a flowchart illustrating an operation method of a head-mounted electronic device, according to various embodiments of the disclosure.

In operation 1610, the processor of the head-mounted electronic device 1500 may receive information related to an FoV for content from the electronic device 101 through the interface 1520.

In operation 1620, the processor may determine the FoV for the content based on the information related to the FoV, received from the electronic device 101.

In another example, the head-mounted electronic device 1500 may receive information about the FoV determined by the electronic device 101 from the electronic device 101. In this case, operation 1620 in which the head-mounted electronic device 1500 determines the FoV may be omitted.

In operation 1630, the head-mounted electronic device 1500 may move at least one lens or adjust a focus of the at least one lens, based on the determined FoV.

Figure 17A:
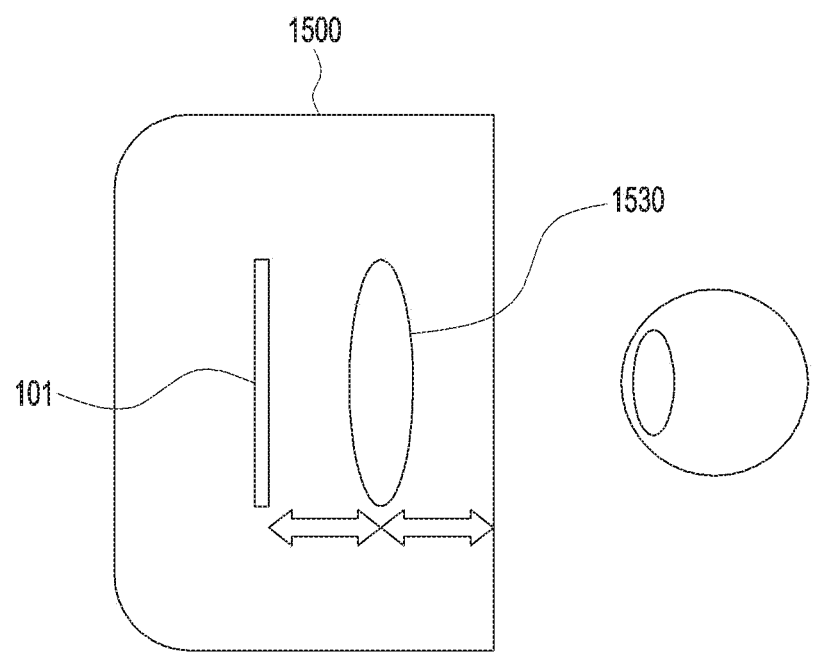
FIGS. 17A and 17B are views for describing a method, performed by a head-mounted electronic device, of adjusting a position and a focus of at least one lens, according to various embodiments of the disclosure.

For example, as shown in FIG. 17A, the electronic device 101 may be mounted in the head-mounted electronic device 1500. The head-mounted electronic device 1500 may move the at least one lens 1530 based on the determined FoV. For example, the head-mounted electronic device 1500 may move the at least one lens 1530 toward the electronic device 101 based on the determined FoV, when the determined FoV is less than a designated FoV. In another example, the head-mounted electronic device 1500 may move the at least one lens 1530 toward the user based on the determined FoV, when the determined FoV is greater than the designated FoV.

Figure 17B:
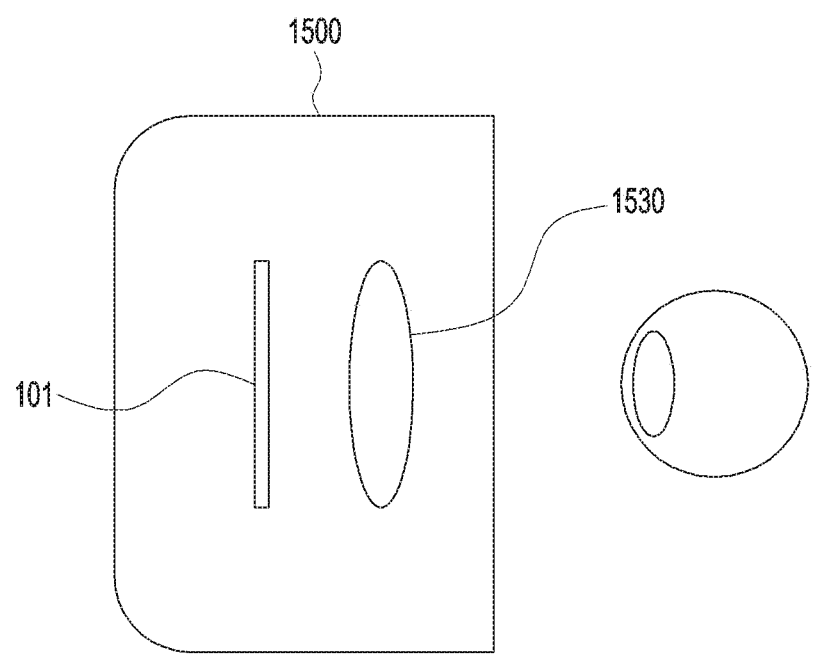

In another example, as shown in FIG. 17B, the head-mounted electronic device 1500 may adjust the focus of the at least one lens 1530 based on the determined FoV. For example, the head-mounted electronic device 1500 may determine the focus of the at least one lens 1530 such that a magnification of the at least one lens 1530 is increased when the determined FoV is less than the designated FoV, and such that the magnification of the at least one lens 1530 is reduced when the determined FoV is greater than the designated FoV. The head-mounted electronic device 1500 may apply current to the at least one lens 1530 such that the focus of the at least one lens 1530 is adjusted to the determined focus.

Each of the foregoing elements described herein may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions.

The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

According to various embodiments of the disclosure, a non-transitory computer-readable recording medium has recorded thereon a program to be executed on a computer, in which the program includes executable instructions that cause, when executed by a processor, the processor to identify information related to a field of view (FoV) for content, to determine the FoV for the content based on the information, and to play display data of the content based on the determined FoV by using the display.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

The invention claimed is:

1. An electronic device comprising:
a display; and
a processor,
wherein the processor is configured to:
identify information related to a field of view (FoV) for content when adjustment of the FoV for the content is allowed for playback of the content based on a pre-stored user configuration,
identify the FoV for the content based on the information,
adjust display data of the content based on the identified FoV such that a height of a first display region of the display data displayed through the display is adjusted according to a designated rate corresponding to the identified FoV, and
play (1) the adjusted display data of the content via the first display region of the display and (2) a black image via a second display region other than the first display region based on the identified FoV.

2. The electronic device of claim 1, wherein the information comprises at least one of additional information related to the FoV for the content or configuration information related to the FoV.

3. The electronic device of claim 2,
wherein the additional information comprises at least one of information indicating the FoV, which is configured for the content, or information used to identify the FoV for the content, and
wherein the information used to identify the FoV for the content comprises at least one of:
information indicating whether the content is two-dimensional (2D) content or three-dimensional (3D) content,
information indicating whether the content is an image or a video,
information indicating whether the content provides an interface for interaction, or
information about motion of at least one object included in the content.

4. The electronic device of claim 2, wherein the configuration information comprises at least one of configuration information indicating whether screen switchover is possible according to movement of a head of a user, configuration information about a method of playing the display data of the content, or configuration information about a brightness used for playback of the display data of the content.

5. The electronic device of claim 1, further comprising:
a memory configured to store information for identifying the FoV,
wherein the processor is further configured to identify the FoV for the content based on the information for identifying the FoV and the information related to the FoV for the content.

6. The electronic device of claim 1, wherein the processor is further configured to identify the FoV for the content based on the information related to the FoV for the content and user-configured information about the FoV.

7. The electronic device of claim 6, further comprising:
a memory configured to store information for identifying the FoV,
wherein the processor is further configured to identify the FoV for the content based on the information for identifying the FoV, the information related to the FoV for the content, the user-configured information about the FoV.

8. The electronic device of claim 1, wherein the processor is further configured to:
play, through the display, the display data of the content based on a designated FoV; and
play, through the display, the display data of the content based on the identified FoV, after playback of display data, which corresponds to a designated frame number, of the content based on the designated FoV.

9. The electronic device of claim 1, wherein the processor is further configured to play, through the display, a designated image overlappingly with the display data of the content in at least a region of the display, the at least a region being identified based on the identified FoV.

10. The electronic device of claim 1, wherein the processor is further configured to deliver information about the identified FoV or the display data of the content to the display.

11. The electronic device of claim 10, wherein the processor is further configured to play, through the display, the display data of the content in a region of the display, the region being identified based on the information about the identified FoV.

12. A non-transitory computer-readable recording medium having recorded thereon a program to be executed on a computer, wherein the program comprises executable instructions that cause, when executed by a processor, the processor to:
identify information related to a field of view (FoV) for content, when adjustment of the FoV for the content is allowed for playback of the content based on a pre-stored user configuration;
identify the FoV for the content based on the information;
adjust display data of the content based on the identified FoV such that a height of a first display region of the display data displayed through the display is adjusted according to a designated rate corresponding to the identified FoV; and
play (1) the adjusted display data of the content via the first display region of the display and (2) a black image via a second display region other than the first display region based on the identified FoV.

13. The non-transitory computer-readable recording medium of claim 12, wherein the identifying of the FoV for the content comprises identifying the FoV for the content based on stored information for identifying the FoV and the information related to the FoV for the content.

14. The non-transitory computer-readable recording medium of claim 12, wherein the playing of the display data of the content based on the identified FoV comprises playing the display data of the content based on the identified FoV after display of display data, which corresponds to a designated frame number, of the content, based on a designated FoV.

15. The non-transitory computer-readable recording medium of claim 12, wherein the playing of the display data of the content based on the identified FoV comprises playing designated display data overlappingly with the display data of the content in at least a part of a display of the electronic device, the at least a part being identified based on the identified FoV for the content.

16. A head-mounted electronic device comprising:
a frame to which a display is mountable or demountable;
an interface arranged on a side of the frame and communicating with the display in connection with the display;
at least one lens which is arranged to be movable in the frame and a focus of which is adjusted according to applied electric current;
a driving unit arranged in the frame and moving the at least one lens in the frame; and
a processor arranged in the frame,
wherein the processor is configured to:
receive information related to a field of view (FoV) for content from the display through the interface, when adjustment of the FoV for the content is allowed for playback of the content based on a pre-stored user configuration,
identify the FoV for the content based on the information, wherein a height of a first display region of display data of the content displayed through the display is adjusted according to a designated rate based on the identified FoV, and a black image is played via a second display region other that the first display region, and
move the at least one lens or adjust a focus of the at least one lens, based on the identified FoV.

17. The head-mounted electronic device of claim 16, wherein the processor is further configured to:
control the driving unit to move the at least one lens to a position identified based on the identified FoV; and
apply electric current to the at least one lens such that the focus of the at least one lens is adjusted to a focus identified based on the identified FoV.

* * * * *